(12) United States Patent
Oguchi

(10) Patent No.: US 10,088,671 B2
(45) Date of Patent: Oct. 2, 2018

(54) TRANSMITTED LIGHT VOLUME ADJUSTING APPARATUS AND TRANSMITTED LIGHT VOLUME ADJUSTING METHOD

(71) Applicant: SONY CORPORATION, Tokyo (JP)

(72) Inventor: Hisayuki Oguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 33 days.

(21) Appl. No.: 14/472,926

(22) Filed: Aug. 29, 2014

(65) Prior Publication Data

US 2015/0070561 A1    Mar. 12, 2015

(30) Foreign Application Priority Data

Sep. 11, 2013  (JP) ................................. 2013-188550

(51) Int. Cl.
   *G02B 26/02*    (2006.01)
   *G03B 11/00*    (2006.01)

(52) U.S. Cl.
   CPC ............ *G02B 26/023* (2013.01); *G03B 11/00* (2013.01)

(58) Field of Classification Search
   CPC ........................... G03B 11/011; G02B 26/023
   USPC ....................................................... 348/340
   See application file for complete search history.

(56) References Cited

U.S. PATENT DOCUMENTS

| | | | | |
|---|---|---|---|---|
| 5,528,287 A * | 6/1996 | Stern | ...................... | B64D 15/20 348/25 |
| 5,828,500 A * | 10/1998 | Kida | ...................... | G01M 11/02 356/237.1 |
| 2006/0082708 A1* | 4/2006 | Nagase | .................. | G02B 5/305 349/124 |
| 2009/0128745 A1* | 5/2009 | Ikeda | .................... | G02B 5/3025 349/96 |
| 2012/0062845 A1* | 3/2012 | Davis | ....................... | G03B 9/08 352/45 |
| 2012/0269050 A1* | 10/2012 | Okada | .................. | G11B 7/1369 369/100 |
| 2013/0293888 A1* | 11/2013 | Zhao | ..................... | G02B 5/3066 356/369 |
| 2014/0104612 A1* | 4/2014 | Li | ........................... | G01B 11/26 356/364 |

FOREIGN PATENT DOCUMENTS

JP            2001-160919 A       6/2001

* cited by examiner

*Primary Examiner* — Antoinette Spinks
(74) *Attorney, Agent, or Firm* — Chip Law Group

(57) ABSTRACT

There is provided a transmitted light volume adjusting apparatus including a first polarizing plate provided on an optical axis, the first polarizing plate being configured to transmit light in a first polarizing direction, a second polarizing plate provided on the optical axis at a back stage of the first polarizing plate, the second polarizing plate being configured to transmit light in a second polarizing direction, and a first actuator configured to rotate the first polarizing plate and the second polarizing plate around a direction of the optical axis as a rotation axis direction in a state in which a difference between polarizing axes, which is an angle formed by the first polarizing direction and the second polarizing direction, is kept constant.

15 Claims, 13 Drawing Sheets

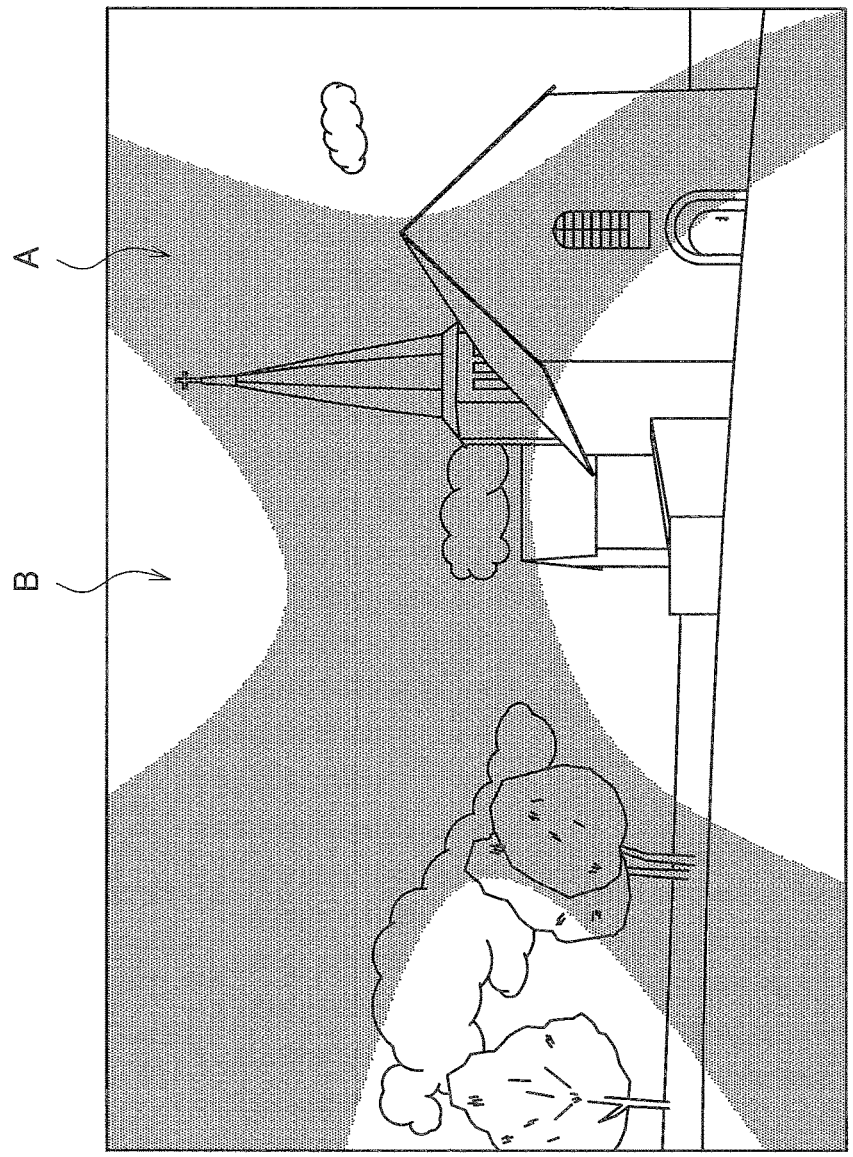

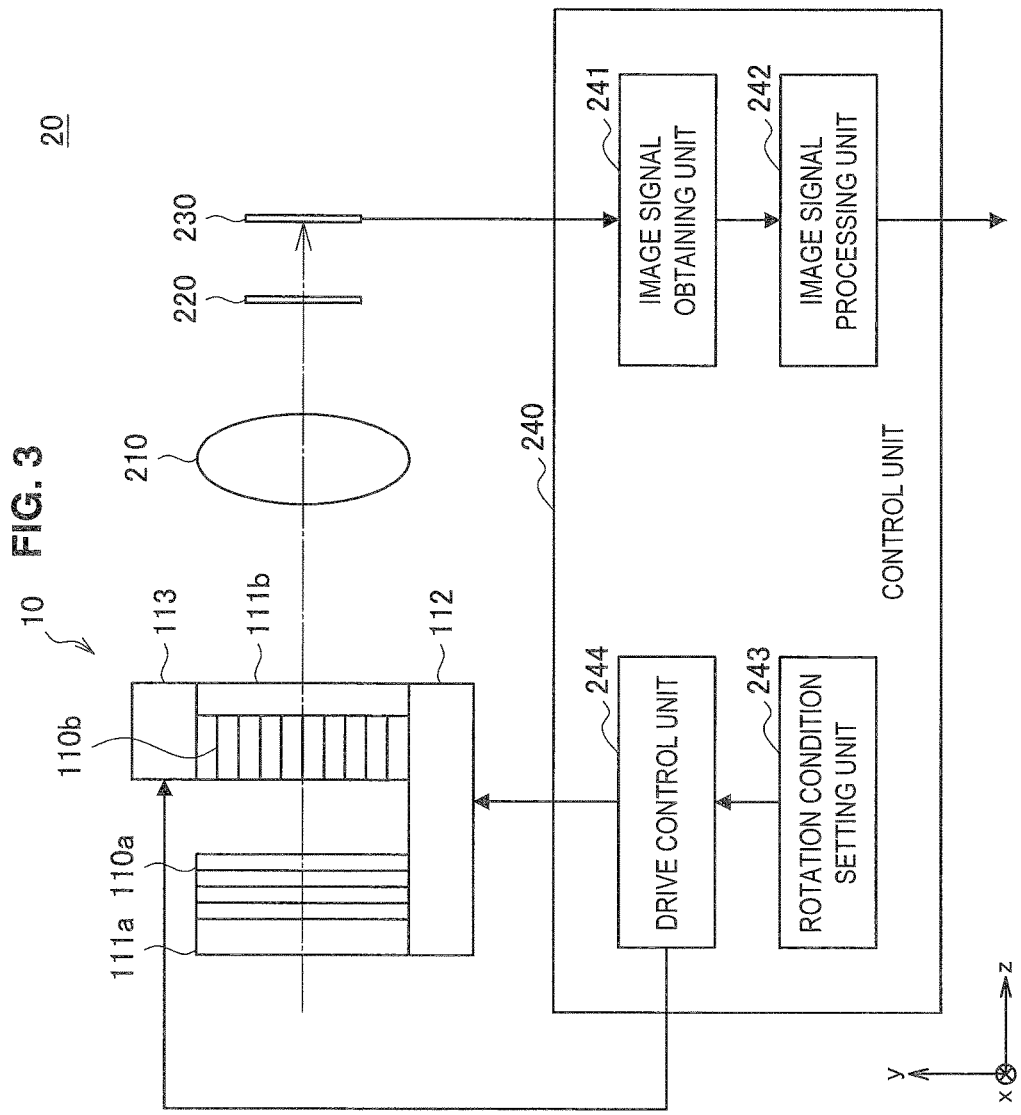

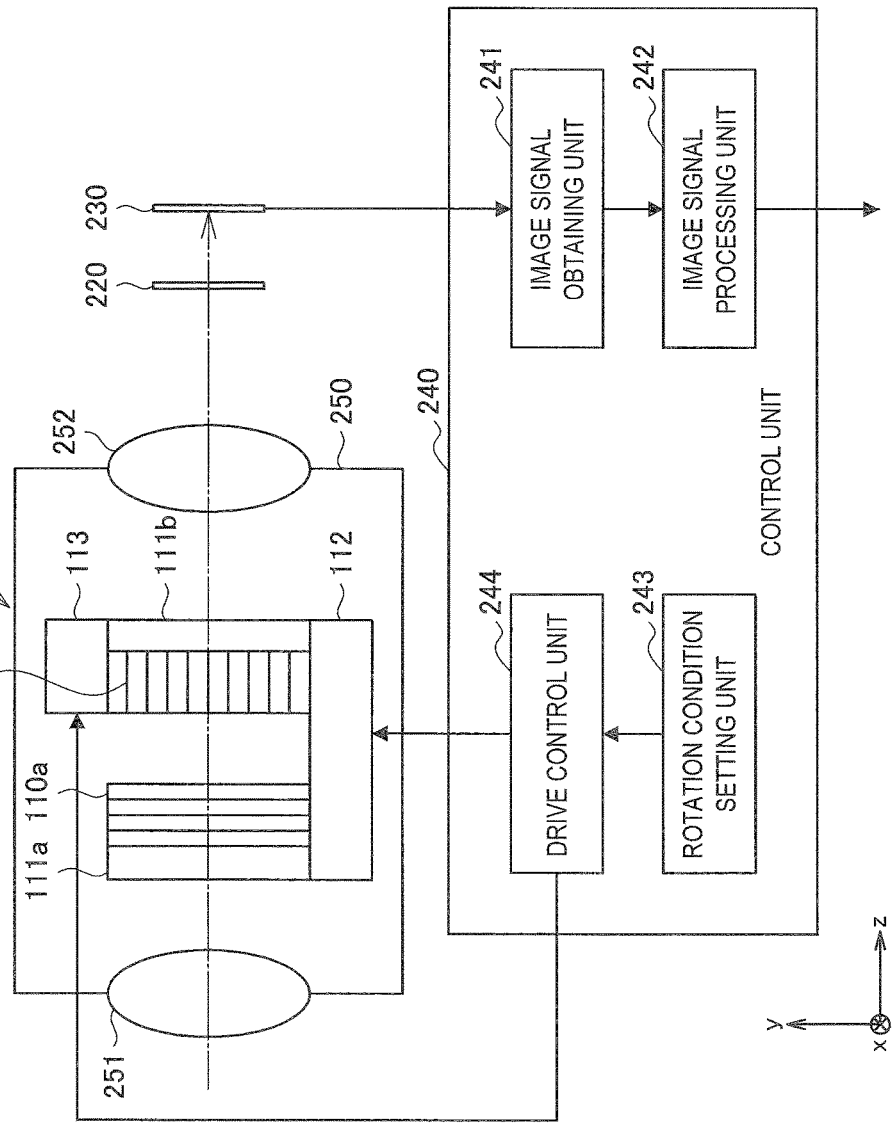

FIG. 11

| PATTERN | SAME | DIFFERENT |
|---|---|---|
| A | OPTICAL AXIS, ROTATION AXIS OF POLARIZING PLATE 110a, AND ROTATION AXIS OF POLARIZING PLATE 110b | — |
| B | OPTICAL AXIS AND ROTATION AXIS OF POLARIZING PLATE 110a | ROTATION AXIS OF POLARIZING PLATE 110b |
| C | OPTICAL AXIS AND ROTATION AXIS OF POLARIZING PLATE 110b | ROTATION AXIS OF POLARIZING PLATE 110a |
| D | ROTATION AXIS OF POLARIZING PLATE 110a AND ROTATION AXIS OF POLARIZING PLATE 110b | OPTICAL AXIS |
| E | — | OPTICAL AXIS, ROTATION AXIS OF POLARIZING PLATE 110a, AND ROTATION AXIS OF POLARIZING PLATE 110b |

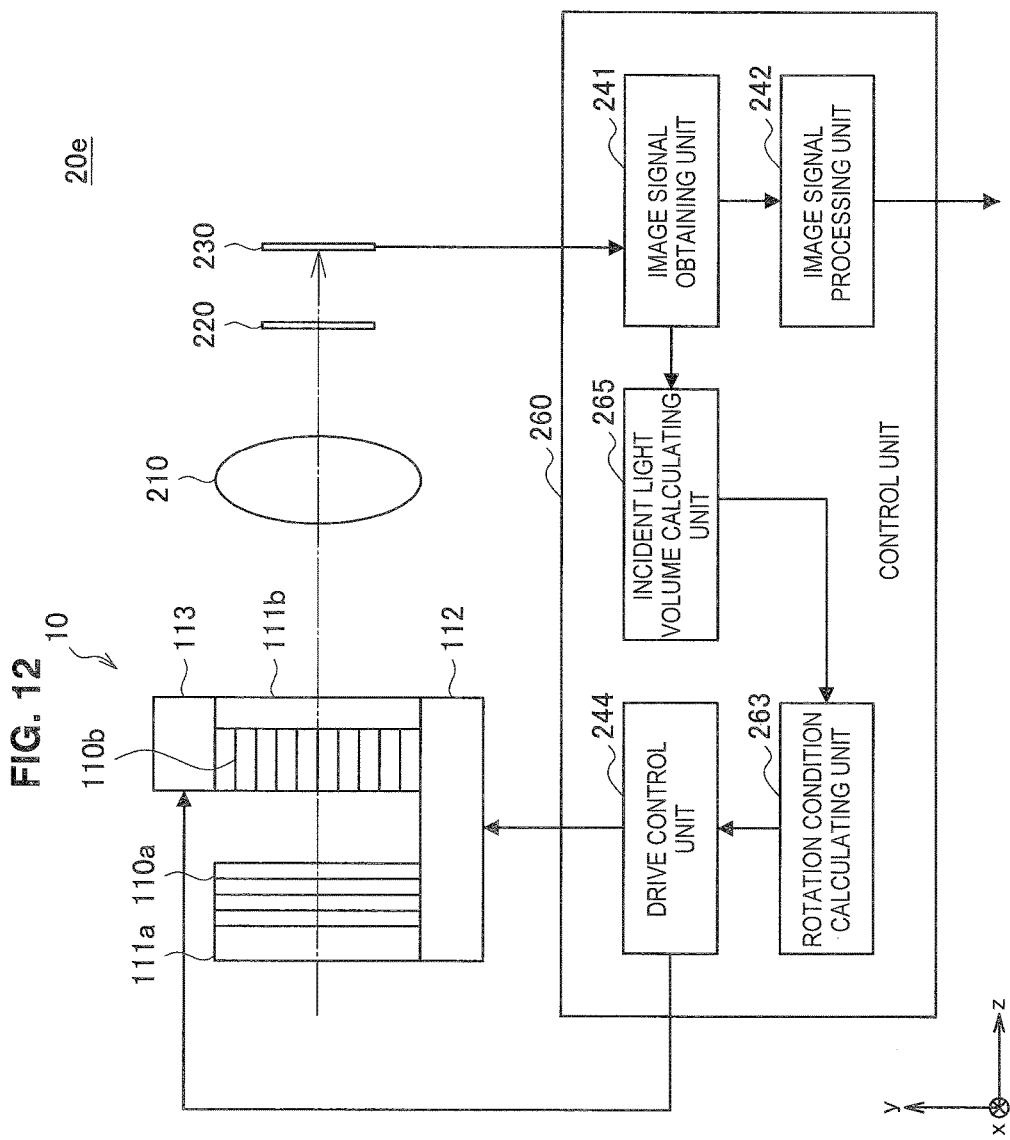

TRANSMITTED LIGHT VOLUME ADJUSTING APPARATUS AND TRANSMITTED LIGHT VOLUME ADJUSTING METHOD

CROSS REFERENCE TO RELATED APPLICATIONS

This application claims the benefit of Japanese Priority Patent Application JP 2013-188550 filed Sep. 11, 2013, the entire contents of which are incorporated herein by reference.

BACKGROUND

The present disclosure relates to a transmitted light volume adjusting apparatus and a transmitted light volume adjusting method.

In the related art, for example, in an apparatus that detects light of a digital video camera, a digital still camera, or the like, a neutral density filter (ND filter) is used so as to adjust the light volume incident on the apparatus. As an example of the ND filter, a technique is proposed in which the incident light volume is adjusted by combination of two polarizing plates. For example, JP 2001-160919A discloses a technique to arrange two polarizing plates on an optical axis of an imaging lens of an imaging apparatus and to rotate the polarizing direction (polarizing axis) of one of the polarizing plates with respect to the polarizing axis of the other polarizing plate, thereby adjusting the volume of light that travels on the optical axis.

SUMMARY

Here, in a case in which the transmitted light volume in the ND filter has an in-plane unevenness (in-plane variation), for example, the light volume incident on an image sensor of the imaging apparatus might have the in-plane variation, which leads to a decrease in image quality of a picked up image. With the technique disclosed in JP 2001-160919A, such an in-plane variation of the transmitted light volume in the ND filter has not been taken into consideration.

Accordingly, the present disclosure proposes a novel and improved transmitted light volume adjusting apparatus and transmitted light volume adjusting method which enable suppression of the in-plane variation of the transmitted light volume.

According to an embodiment of the present disclosure, there is provided a transmitted light volume adjusting apparatus including a first polarizing plate provided on an optical axis, the first polarizing plate being configured to transmit light in a first polarizing direction, a second polarizing plate provided on the optical axis at a back stage of the first polarizing plate, the second polarizing plate being configured to transmit light in a second polarizing direction, and a first actuator configured to rotate the first polarizing plate and the second polarizing plate around a direction of the optical axis as a rotation axis direction in a state in which a difference between polarizing axes, which is an angle formed by the first polarizing direction and the second polarizing direction, is kept constant.

According to another embodiment of the present disclosure, there is provided a transmitted light volume adjusting method including rotating a first polarizing plate provided on an optical axis, the first polarizing plate being configured to transmit light in a first polarizing direction, and a second polarizing plate provided on the optical axis at a back stage of the first polarizing plate, the second polarizing plate being configured to transmit light in a second polarizing direction, around a direction of the optical axis as a rotation axis direction in a state in which a difference between polarizing axes, which is an angle formed by the first polarizing direction and the second polarizing direction, is kept constant.

According to an embodiment of the present disclosure, a first polarizing plate and a second polarizing plate are rotated around an optical axis direction as a rotation axis direction in a state in which a difference between polarizing axes is kept constant. Accordingly, during the rotation, the transmitted light volume incident on the first polarizing plate and the second polarizing plate is made even in a plane, and an in-plane variation of the transmitted light volume is suppressed.

As described above, according to one or more of embodiments of the present disclosure, the in-plane variation of the transmitted light volume can be further suppressed. Note that the above described effects are not necessarily limiting. That is, the technology according to the present disclosure can exhibit any of the effects described in the specification or other effects that are apparent to a person skilled in the art from the descriptions in the specification, along with the above effects or instead of the above effects.

BRIEF DESCRIPTION OF THE DRAWINGS

FIG. 1 shows an example of a picked up image in which luminance unevenness occurs at a time of imaging by use of an ND filter;

FIG. 3 is a schematic view showing a configuration example of an imaging apparatus in which a transmitted light volume adjusting apparatus according to an embodiment of the present disclosure is used;

FIG. 10 is a schematic diagram showing a configuration example of an imaging apparatus according to a modification example in which the arrangement of component members on an optical axis is different;

FIG. 11 shows a relation between an optical axis and a rotation axis of two polarizing plates; and FIG. 12 is a schematic diagram of a configuration example of an imaging apparatus according to a modification example in which a method of setting conditions for rotating a polarizing plate in a transmitted light volume adjusting apparatus is different.

DETAILED DESCRIPTION OF THE EMBODIMENT(S)

Figure 2A:
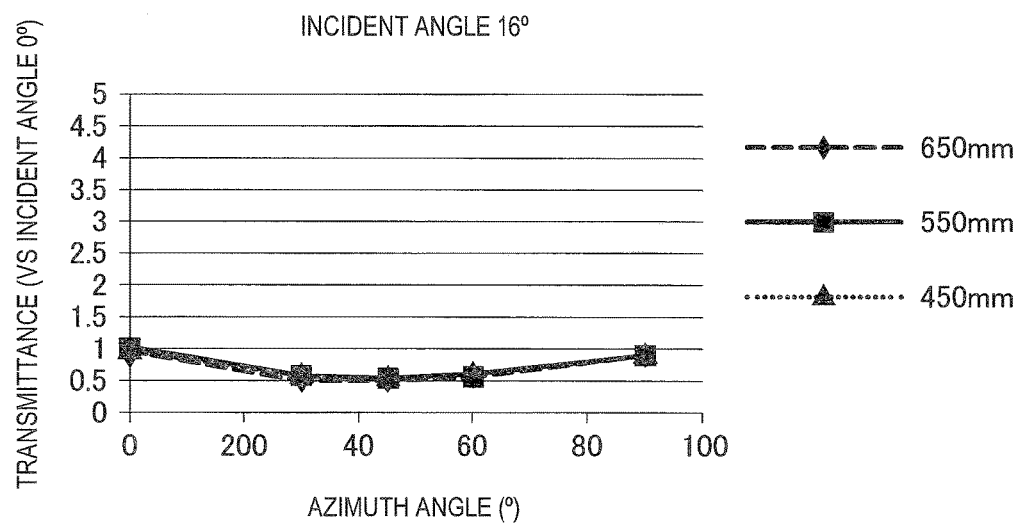
FIG. 2A shows an in-plane distribution of a transmitted light volume in an existing ND filter.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order:
1. Study of ND Filter
2. Configuration of Apparatus
3. Modification Examples
3-1. Modification Example of Polarizing Plate Having Curvature
3-2. Modification Example of Component Members Having Different Arrangement on Optical Axis
3-3. Modification Example of Optical Axis and Polarizing Plate Having Different Rotation Axis
3-4. Modification Example of Different Method of Setting Rotation Conditions
4. Supplementary Explanation

1. STUDY OF ND FILTER

First, prior to a description of a preferred embodiment of the present disclosure, a background of the present disclosure made by the present inventor will be described.

In the related art, in an imaging apparatus such as a digital video camera or a digital still camera, the incident light volume is adjusted by use of an iris and/or an ND filter. However, when the iris has a small diameter in order to adjust the incident light volume, for example, wraparound of light due to a diffraction phenomenon occurs and an in-plane unevenness is generated in the light incident on an image sensor, which might lead to a degradation of the image quality of a picked up image. In particular, when the arrangement of pixels in the image sensor has a higher density, such a degradation of the image quality can be more obvious. Accordingly, in order to avoid the small diameter of the iris more than necessary, it is proposed to adjust the incident light volume by combination of the iris and the ND filter.

However, in a case of using the ND filter, in accordance with the light volume of a subject, the most suitable ND filter is expected to be selected and used from among a plurality of ND filters having different transmitted light volumes. Although an imaging apparatus in which a plurality of ND filters are switched as appropriate is also proposed, such an imaging apparatus is not preferable in terms of cost because it is necessary to secure a space for storing the plurality of ND filters.

Accordingly, a transmitted-light-volume-changeable ND filter which can change the transmitted light volume in accordance with the light volume of the subject is proposed. For example, JP 2001-160919A disclosed a transmitted-light-volume-changeable ND filter configured by two polarizing plates provided in a housing of an imaging apparatus. Further, a transmitted-light-volume-changeable ND filter configured by two polarizing plates also is proposed as an accessory (peripheral device) which is externally attached to a lens of an imaging apparatus such as a digital video camera or a digital still camera. In such ND filters, a polarizing plate provided closer to the subject is configured to be rotatable around an optical axis direction as a rotation axis direction with respect to a polarizing plate provided closer to the image sensor or the lens. Further, the transmitted light volume can be adjusted by adjusting the angle formed by polarizing axes of the two polarizing plates (hereinafter also referred to as difference between polarizing axes). Note that, in the following description, the ND filter refers to an ND filter configured by combination of such two polarizing plates unless otherwise specified.

However, when imaging is performed by use of the above described existing ND filters, depending on the usage conditions, the image quality of a picked up image might be degraded. For example, when the transmitted light volume in the ND filter has an in-plane unevenness (in-plane variation), the in-plane variation may be generated in the light volume incident on an image sensor of an imaging apparatus, which might lead to an in-plane unevenness of the luminance of the picked up image. Such an in-plane unevenness of the luminance of the picked up image due to the in-plane unevenness of the transmitted light volume in the ND filter is also referred to as luminance unevenness in the following description.

Such luminance unevenness due to the in-plane variation of the transmitted light volume in the ND filter will be described with reference to FIG. 1. FIG. 1 shows an example of a picked up image in which the luminance unevenness occurs at the time of imaging by use of the ND filter.

Referring to FIG. 1, an area having a relatively low luminance (hereinafter referred to as low-luminance area A) exists in an X shape in the picked up image. In FIG. 1, the low-luminance area A is shown by hatching. An area without hatching is an area having a relatively high luminance (hereinafter referred to as high-luminance area B). In this manner, at the time of imaging by use of the ND filter, the picked up image may include the low-luminance area A and the high-luminance area B and may have the luminance unevenness. Such luminance unevenness is not troublesome in a case in which the transmitted light volume in the ND filter is large because the variation with respect to the average transmitted light volume in plane is relatively small, but becomes obvious in a case in which the transmitted light volume in the ND filter is small, which leads to a decrease in the image quality of the picked up image. Examples of a situation in which the transmitted light volume in the ND filter can be adjusted to be small include a case of imaging a subject having a relatively high luminance, such as a case in which arc light, molten pool, or the like is imaged in a factory or the like or a case in which the sun is imaged for an astronomical observation.

Figure 2B:
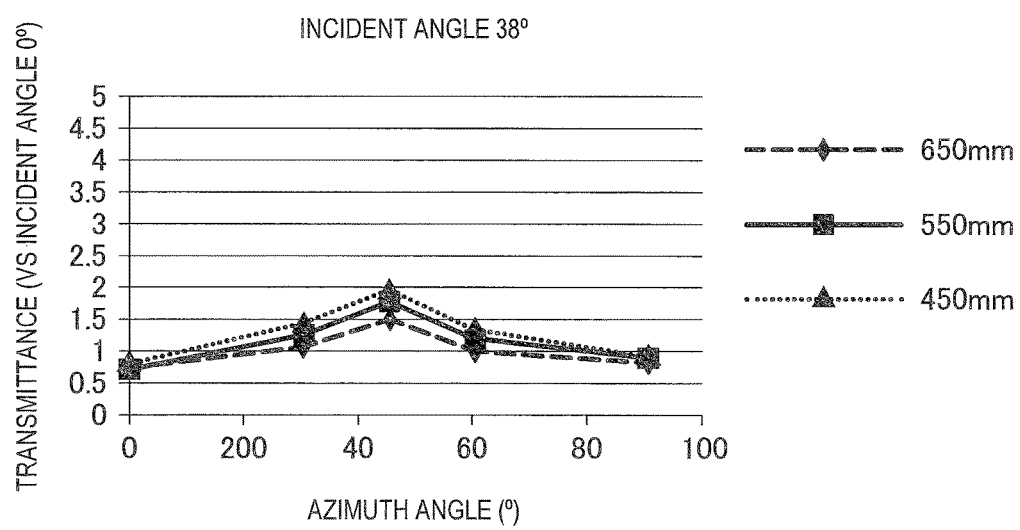
FIG. 2B shows an in-plane distribution of a transmitted light volume in an existing ND filter.
Figure 2C:
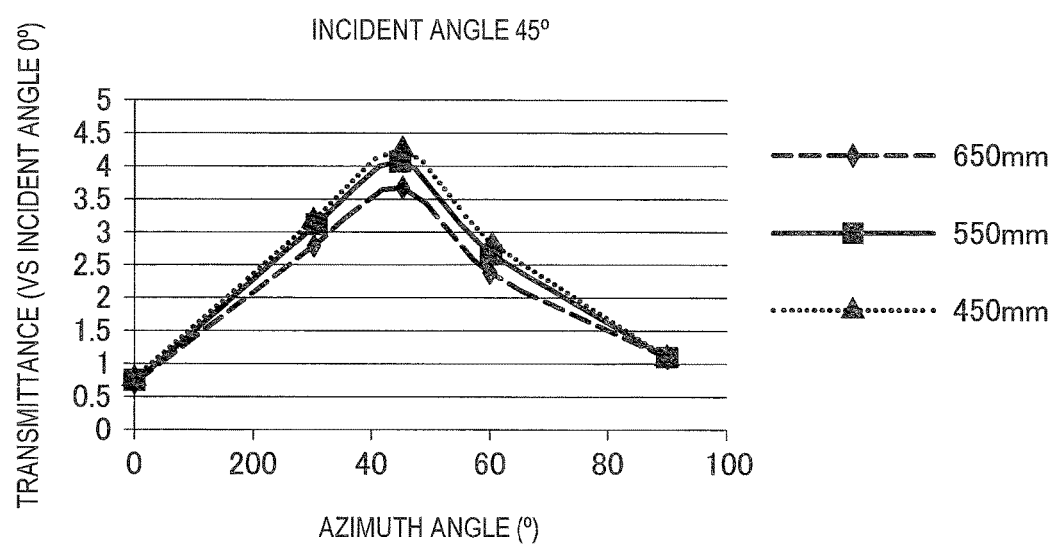
FIG. 2C shows an in-plane distribution of a transmitted light volume in an existing ND filter.

The present inventor has intensively studied the luminance unevenness due to the ND filter. Specifically, the present inventor has intensively studied an in-plane distribution of the transmitted light volume in the existing ND filter. The results of the study of the existing ND filter will be described with reference to FIG. 2A to FIG. 2C. FIG. 2A to FIG. 2C each show the in-plane distribution of the transmitted light volume in the existing ND filter. Here, as described above, in a case in which the transmitted light volume in the ND filter is relatively small, the luminance unevenness in the picked up image is more obvious. Further, in the ND filter configured by combination of two polarizing plates, the transmitted light volume becomes the minimum when the difference between polarizing axes is 90°. Accordingly, FIG. 2A to FIG. 2C show the results of the study of the in-plane distribution of the transmitted light volume in a case in which the difference between polarizing axes of the ND filter is 90°.

In each of FIG. 2A to FIG. 2C, dependence of transmittance on an azimuth angle is plotted by the horizontal axis representing the azimuth angle and the vertical axis representing the transmittance of light in the ND filter. Here, the azimuth angle is an angle indicating the direction in a plane that is perpendicular to the optical axis (that is, a plane that is parallel to the polarizing plates included in the ND filter), the angle from the polarizing axis of one of the polarizing plates included in the ND filter (e.g., the polarizing plate closer to the image sensor) in the example shown in FIG. 2A to FIG. 2C. Further, the value on the vertical axis represents the ratio to the transmittance in a case in which the incident angle is 0°. Here, the incident angle is the angle of light incident on a light-receiving surface of the polarizing plate included in the ND filter in a case in which the direction corresponding to the optical axis is 0°, the angle corresponding to the angle of view in the imaging apparatus. For example, it can be said that a substantially central area in the picked up image indicates an area where the incident angle is approximately 0° and that a peripheral area in the picked up image indicates an area having a larger incident angle and a larger angle of view. Further, in FIG. 2A to FIG. 2C, in order to study spectral characteristics, the dependence of transmittance on the azimuth angle of light having different wavelengths (450 nm, 550 nm, and 650 nm) is also plotted.

FIG. 2A, FIG. 2B, and FIG. 2C show the dependence of transmittance on the azimuth angle in a case in which the incident angles are 16°, 38°, and 45°, respectively. Referring to FIG. 2A to FIG. 2C, it is found that the transmittance of light in the ND filter has dependence on the azimuth angle and dependence on the incident angle.

First, as for the dependence on the azimuth angle, as shown in FIG. 2B and FIG. 2C, in a case in which the incident angle is large (that is, the angle of view is large) and the azimuth angle is approximately 45°, the transmittance of light in the ND filter tends to be higher than in a case in which the azimuth angle has other values. Further, although not shown expressly in FIG. 2B and FIG. 2C, it is also found that the transmittance is similarly higher when the azimuth angle is approximately 135°, approximately 225°, and approximately 315°, than in a case in which the azimuth angle has other values. In this manner, in the ND filter, in a case in which the azimuth angle is 45(°)+90(°)×n (n is a given integer), the transmittance of light tends to be high. Here, referring to FIG. 1, the picked up image includes four high-luminance areas B in an upper portion, a lower-portion, a left portion, and a right portion, substantially, thereby showing a phenomenon that does not contradict the above described the dependence of transmittance on the azimuth angle. Note that, as described above, since each of FIG. 2A to FIG. 2C shows the in-plane distribution of the transmitted light volume in a case in which the difference between polarizing axes of the ND filter is 90°, the direction in which the azimuth angle is 45(°)+90(°)×n (e.g., 45°, 135°, 225°, or 315°) is the direction in which the angle between polarizing axes of the two polarizing plates is 45°.

Further, as for the dependence on the incident angle, it is found that the above described dependence of transmittance on the azimuth angle in the ND filter becomes higher as the incident angle is larger. This shows that, as the incident angle is larger, that is, as the angle of view is larger, the luminance unevenness in the picked up image shown in FIG. 1 becomes more obvious. Furthermore, referring to FIG. 2A to FIG. 2C, it is also found that light having any wavelength band may have the above described dependence of transmittance of light on the azimuth angle in the ND filter and dependence on the incident angle.

Here, the dependence of transmittance of light on the azimuth angle in the ND filter and dependence on the incident angle may be attributed to the structure of the polarizing plates included in the ND filter. Each of the polarizing plates has a structure in which component substances such as organic polymer compounds or metal nanowires are arranged regularly in a certain direction in order to transmit only light having a certain polarizing direction. Therefore, it is assumed that the ratio of light that is incident on the polarizing plate perpendicularly to the polarizing plate and travels through the polarizing plate is different from that of light that is incident on the polarizing plate obliquely from the direction in which the component substances are arranged and travels through the polarizing plate. In this manner, the in-plane variation of the transmittance of light in the ND filter may be generated owing to the geometrical structure of the polarizing plate.

The results of the present inventor's study of the characteristics of the existing ND filter have been described above with reference to FIG. 1 and FIG. 2A to FIG. 2C. The above results of the study will be summarized below.

In the existing ND filter, in particular, in a state in which the transmitted light volume is adjusted to be small, the picked up image has the luminance unevenness, which may lead to a decrease in the image quality. The luminance unevenness may be attributed to the in-plane variation of the transmittance of light in the ND filter. As a result of the study of the in-plane variation of the transmittance of light in the ND filter, the in-plane variation is found to have the dependence on the azimuth angle and the dependence on the incident angle. Specifically, the transmittance of light in the ND filter tends to be higher in a case in which the azimuth angle is 45(°)+90(°)×n (n is a given integer). Further, such a dependence of the transmittance of light on the azimuth angle in the ND filter is found to be more obvious as the incident angle is larger (that is, the angle of view is larger). Furthermore, it is found that light having any wavelength band may have the dependence of the transmittance of light in the ND filter on the azimuth angle and the dependence on the incident angle in a similar manner.

These results of the study show that the existing ND filter may generate the luminance unevenness and may decrease the image quality of the picked up image particularly under imaging conditions with a wide angle of view and a low transmitted light volume. In order to prevent such a decrease in the image quality, existing techniques have proposed to change imaging conditions, such as to change the angle of view (change zoom setting) and to adjust the difference between polarizing axes so as to increase the transmitted light volume. However, the change in imaging conditions may disable the subject to be properly imaged and is not necessarily a preferable way. Accordingly, the present inventor has studied a technique to suppress the in-plane variation of the transmitted light volume and has arrived an embodiment of the present disclosure described below. A preferred embodiment of the present disclosure will be shown below.

2. CONFIGURATION OF APPARATUS

A configuration of a transmitted light volume adjusting apparatus according to an embodiment of the present disclosure will be described with reference to FIG. 3. Note that the following description will be made on a case in which the transmitted light volume adjusting apparatus according to the present embodiment is used for an imaging apparatus. FIG. 3 is a schematic view showing a configuration example of an imaging apparatus in which the transmitted light volume adjusting apparatus according to an embodiment of the present disclosure is used.

Referring to FIG. 3, an imaging apparatus 20 according to the present embodiment includes a transmitted light volume adjusting apparatus 10, a lens 210, an optical low pass filter (OLPF) 220, an image sensor 230, and a control unit 240. In the present embodiment, the transmitted light volume adjusting apparatus 10 is provided in the inside of a housing of the imaging apparatus 20. Light incident on the imaging apparatus 20 travels through the transmitted light volume adjusting apparatus 10, the lens 210, and the OLPF 220 in this order to be incident on the image sensor 230.

In the present embodiment, the imaging apparatus 20 is a so-called digital camera such as a digital video camera or a digital still camera. The imaging apparatus 20 receives the incident light on the image sensor, and takes a picked up image of a subject on the basis of an image signal outputted from the image sensor in accordance with the received light volume. Note that FIG. 3 mainly shows component members arranged on the optical axis of the incident light in the imaging apparatus 20 for simplicity, and illustration of the other component members is omitted. The imaging apparatus 20 can include, other than the shown component members, other component members that are included in a common existing imaging apparatus (e.g., a housing, a power source unit, various buttons that receive user's operation inputs, and a display unit that displays a through image of a picked up image). Note that the component members that are not shown can be known component members in a common imaging apparatus, and thus, a detailed description thereof is omitted.

Here, in the following description, as shown in FIG. 3, the optical axis direction of light incident on the imaging apparatus 20 is defined as a z-axis direction. In the z-axis direction, the direction in which the light is incident on the image sensor 230 is defined as the positive direction of the z-axis. Further, in a plane perpendicular to the z-axis, two directions that intersect with each other are defined as an x-axis and a y-axis. Note that in FIG. 3, the optical axis is shown as an arrow of a dotted line indicating the incident direction. For example, the optical axis can be defined as a straight line that passes through the center of curvature in each the front surface and the rear surface of the lens 210. Further, in the following description, in order to describe the position relation between the component members on the optical axis, a position closer to the subject (i.e., a position in the negative direction of the z-axis) on the optical axis is referred to as front stage, and a position closer to the image sensor 230 (i.e., a position in the positive direction of the z-axis) on the optical axis is referred to as back stage.

The transmitted light volume adjusting apparatus 10 adjusts the volume of light incident on the image sensor 230 by adjusting the transmitted light volume. The transmitted light volume adjusting apparatus 10 includes polarizing plates 110a and 110b, retardation plates 111a and 111b, a first actuator 112, and a second actuator 113.

The polarizing plates 110a and 110b are optical members that allow light having a certain polarizing direction to travel therethrough. The polarizing plates 110a and 110b each have, for example, a structure in which a film formed by adsorption orientation of an iodine-based material and dyes on polyvinyl alcohol (PVA) and extension of the film in one direction is interposed between films formed from triacetylcellulose (TAC). This structure realizes the function of a polarizing plate because the iodine-based material is regularly oriented in a certain direction in the PVA film. However, the polarizing plates 110a and 110b according to the present embodiment are not limited to this example, and polarizing plates having different structures may also be used as the polarizing plates 110a and 110b. Examples of the polarizing plates having different structures include a polarizing plate having a structure in which wire grids are regularly oriented on a glass substrate and having a characteristic of transmitting only a one-side polarizing component, a polarizing plate having a structure in which wire grids are regularly oriented on a resin film base material and having a characteristic of transmitting only a one-side polarizing component, and the like. The structure of the polarizing plate to be used for the polarizing plates 110a and 110b may be decided as appropriate in consideration of the weight and size of the transmitted light volume adjusting apparatus 10, the characteristic of the transmittance of light (e.g., dependence of the transmittance on the wavelength shown in FIG. 4, which will be described later), the manufacturing cost, and the like.

The polarizing plates 110a and 110b are both arranged on the optical axis, and for example, the polarizing plate 110a is provided closer to the subject (at the front stage) and the polarizing plate 110b is provided closer to the image sensor (at the back stage). Adjustment of the difference between polarizing axes of the polarizing plates 110a and 110b enables adjustment of the light volume transmitted through the polarizing plates 110a and 110b. In this manner, in the present embodiment, a so-called ND filter is configured by the two polarizing plates: the polarizing plates 110a and 110b. Note that in the following description, the polarizing plate 110a provided at the front stage is also referred to as first polarizing plate and the polarizing plate 110b provided at the back stage is also referred to as second polarizing plate.

Figure 4:
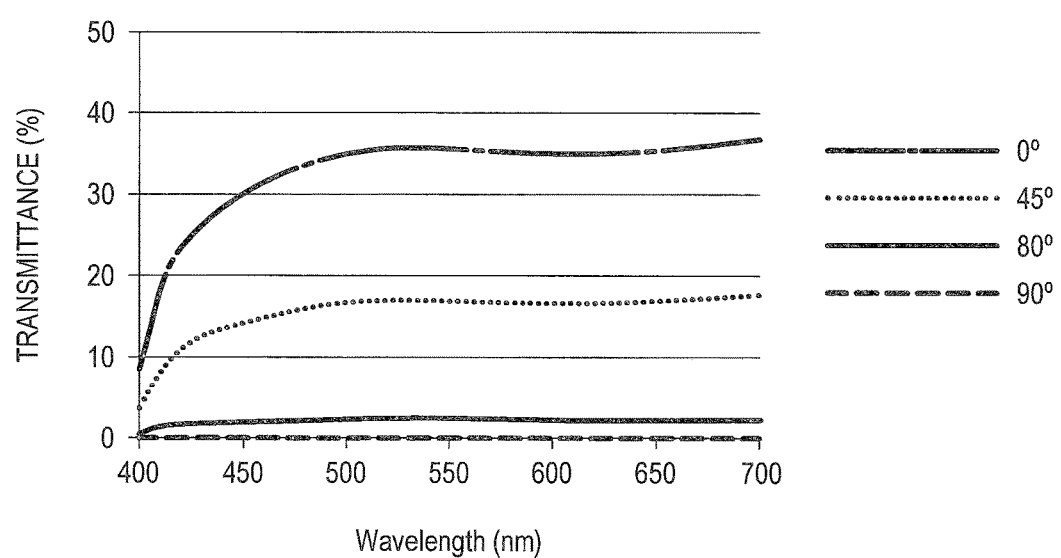
FIG. 4 shows characteristics of a transmittance of light in polarizing plates according to an embodiment.

Here, characteristics of the transmittance of light in the polarizing plates 110a and 110b according to the present embodiment will be described with reference to FIG. 4. FIG. 4 shows characteristics of the transmittance of light in the polarizing plates 110a and 110b according to the present embodiment. In FIG. 4, the dependence of the transmittance on the wavelength is plotted by the horizontal axis representing the wavelength of the incident light and the vertical axis representing the transmittance of light incident on the polarizing plates 110a and 110b. Further, the dependence of the transmittance on the wavelength is plotted for each case in which the difference between polarizing axes of the polarizing plates 110a and 110b is 0°, 45°, 80°, and 90°.

Referring to FIG. 4, in the polarizing plates 110a and 110b, it is found that the transmittance becomes lower as the difference between polarizing axes becomes larger from 0° and that the transmittance becomes the minimum when the difference between polarizing axes is 90°. Further, although not shown expressly in FIG. 4, as the difference between polarizing axes becomes larger than 90°, the transmittance becomes higher, and when the difference between polarizing axes is 180°, the transmittance becomes a value equal to that when the difference between polarizing axes is 0°. Further, as the difference between polarizing axes becomes larger than 180°, the transmittance becomes lower, and when the difference between polarizing axes is 270°, the transmittance becomes a value equal to that when the difference between polarizing axes is 90°. In this manner, in the polarizing plates 110a and 110b, the transmittance becomes the maximum when the difference between polarizing axes is 0(°)+ 180(°)×n (n is a given integer), and the transmittance becomes the minimum when the difference between polarizing axes is 90(°)+180(°)×n. The state in which the difference between polarizing axes is 0° (0(°)+180(°)×n) is commonly referred to as parallel nicol, and the state in which the difference between polarizing axes is 90° (90(°)+180(°)×n) is commonly referred to as crossed nicol.

In this manner, in the polarizing plates 110a and 110b, the transmitted light volume can be adjusted by adjusting the difference between polarizing axes. For example, in a case of imaging a subject with a relatively high luminance, the light volume incident on the imaging apparatus 20 can be reduced by setting the polarizing plates 110a and 110b in a crossed nicol state or a state close to the crossed nicol state, thereby increasing the image quality of the picked up image.

Further, referring to FIG. 4, in the polarizing plates 110a and 110b, the transmittance of light in a short wavelength band is low. This may be attributed to the structure of the polarizing plates 110a and 110b. As described above, the polarizing plates 110a and 110b are each a polarizing plate including the iodine-based material. However, in a case of using a polarizing plate having a different structure, such as the above described polarizing plate having a structure in which wire grids are regularly oriented on a glass substrate, it is assumed that such characteristics that the transmittance of light in a short wavelength band is not so low can be obtained.

The retardation plates 111a and 111b are each an optical member that generates retardation of light having different polarizing states. The retardation plate 111a is provided at the front stage of the polarizing plate 110a and adjusts the polarizing state of light incident on the imaging apparatus 20. Specifically, the retardation plate 111a is provided in order to cancel the polarization of light incident on the polarizing plate 110a. Here, in general, reflected light of the subject includes light in different wavelength bands having polarization. Therefore, when such light is incident on the polarizing plate 110a without through the retardation plate 111a, for example, the polarizing plate 110a may be rotated around the optical axis direction as the rotation axis direction, and the polarizing direction of the polarizing plate 110a changes with respect to the absolute coordinate, which may generate a phenomenon in which the wavelength band of light that can travel through the polarizing plate 110a changes and the color of the subject in the picked up image varies in plane and changes (hereinafter this phenomenon is also referred to as color unevenness). In the present embodiment, the retardation plate 111a is provided at the front stage of the polarizing plate 110a and polarization of light incident on the polarizing plate 110a is prevented, so that light in any wavelength band can be incident on the polarizing plate 110a and the color unevenness can be suppressed. The retardation plate 111a can be designed as appropriate in consideration of retardation or the direction of the optical axis, for example. For example, the use of synthetic quartz having relatively large retardation as the retardation plate 111a can preferably cancel the polarization of the reflected light from the subject. Note that in the following description, the retardation plate 111a provided at the front stage of the polarizing plate 110a is also referred to as first retardation plate.

The retardation plate 111b is provided at the back stage of the polarizing plate 110b and adjusts the polarizing state of light incident on the image sensor 230. As the retardation plate 111b, for example, a retardation film used for a so-called circular-polarized light filter (C-PL filter) can be used. Such a retardation plate 111b can convert linearly polarized light into circularly polarized light. By being combined with the OLPF 220 provided at the back stage, the retardation plate 111b has a function of reducing the generation of so-called moire. Note that in the following description, the retardation plate 111b provided at the back stage of the polarizing plate 110b is also referred to as second retardation plate.

Here, suppression of moire by the retardation plate 111b and the OLPF 220 will be described. Moire is a stripe pattern that can be generated in a picked up image when a subject having a periodical pattern (e.g., plaid clothes) is imaged. It is considered that moire is generated in accordance with the relation between the pitch of the pattern of the subject and the pitch of the arrangement of pixels in the image sensor 230. In order to suppress moire, a technique is proposed to separate incident light beams into a plurality of light beams and to intentionally reduce the resolution in a certain frequency band. For example, with a technique called square four-point separation, incident light beams travel through three birefringence materials—the retardation plate 111a, the OLPF 220, and another optical member (e.g., an optical member using polarization such as a half mirror)—to be able to be separated into four light beams having certain isolation widths. The isolation widths of the four light beams are set to the width of a pixel pitch of the image sensor 230, for example. Since the incident light beams are separated by the width of the pixel pitch of the image sensor 230, for example, in this manner, the resolution can be reduced moderately and the generation of moire can be suppressed. Optical characteristics of the retardation plate 111a can be designed in a manner that the incident light beams can be separated by a desired isolation width when the retardation plate 111a is combined with the optical member using polarization, such as the OLPF 220 or a half mirror.

On the other hand, the suppression of the generation of moire by use of the retardation plate 111a and the OLPF 220 corresponds to intentional reduction of the resolution in a frequency band where moire is generated, as described above. Accordingly, in the present embodiment, the transmitted light volume adjusting apparatus 10 may include a mechanism to insert and extract the retardation plate 111a. In a case in which the retardation plate 111a does not exist on the optical axis, the incident light beams on the imaging apparatus 20 can be separated into two light beams having a certain isolation width in either the x-axis direction or the y-axis direction, for example (horizontal (vertical) two-point separation). The horizontal (vertical) two-point separation may enable the generation of moire to be suppressed in the x-axis direction or the y-axis direction and also a high resolution with respect to the direction intersecting the x-axis direction or the y-axis direction to be kept. Accordingly, in the present embodiment, since the transmitted light volume adjusting apparatus 10 includes a mechanism to insert and extract the retardation plate 111a, the generation of moire can be suppressed and also reduction in the resolution more than necessary can be prevented in a manner that, in a case in which the generation of moire is obvious in both the horizontal and vertical directions, the square four-point separation is performed by inserting the retardation plate 111a on the optical axis, and in a case in which the generation of moire is obvious in either the horizontal or vertical direction, the horizontal (vertical) two-point separation is performed by extracting the retardation plate 111a from the optical axis, for example.

Let us go back to the description of the transmitted light volume adjusting apparatus 10 with reference to FIG. 3. The second actuator 113 is an actuator that rotates the polarizing plate 110b around the optical axis as the rotation axis direction. The axis of rotation of the polarizing plate 110b caused by the second actuator 113 corresponds to the optical axis, for example. Drive of the second actuator 113 is controlled by a drive control unit 244 of the control unit 240, which will be described later. The rotation of the polarizing plate 110b caused by the second actuator 113 changes the difference between polarizing axes of the polarizing plate 110a and the polarizing plate 110b, and the transmitted light volume in the polarizing plates 110a and 110b can be adjusted. In this manner, the second actuator 113 can be regarded as an actuator for adjusting the transmitted light volume in the polarizing plates 110a and 110b. Note that, as a specific mechanism of the second actuator 113, an existing known configuration by which a member can be rotated around a certain direction as the rotation axis direction may be used.

Note that, in the present embodiment, the second actuator 113 rotates the polarizing plate 110b provided closer to the image sensor 230 out of the polarizing plates 110a and 110b. Here, as described above, since the color unevenness can be generated by a change in the wavelength band of the incident light on the polarizing plate 110a provided closer to the subject, when the polarizing plate 110a is rotated with respect to the polarizing plate 110b in order to adjust the transmitted light volume, the generation of color unevenness may be obvious. In the present embodiment, since the second actuator 113 rotates the polarizing plate 110b provided closer to the image sensor 230 out of the polarizing plates 110a and 110b, effects of adjusting the transmitted light volume in the polarizing plates 110a and 110b and also suppressing the generation of color unevenness can be obtained. However, the present embodiment is not limited to this example, and the second actuator 113 may rotate either of the polarizing plates 110a and 110b in accordance with the subject and the usage of the imaging apparatus 20. For example, in a case in which the color unevenness in a picked up image is not necessarily considered, such as a case of imaging a subject that is assumed to generate few color unevenness or a case of using the imaging apparatus 20 for such usage that may have color unevenness, the second actuator 113 may rotate the polarizing plate 110a out of the polarizing plates 110a and 110b. Further, in a case in which the usage of the imaging apparatus 20 is limited and it is assumed in advance that the luminance of a subject does not change largely, the imaging apparatus 20 does not have to include the second actuator 113. In a case in which the imaging apparatus 20 does not include the second actuator 113, the difference between polarizing axes of the polarizing plate 110a and the polarizing plate 110b is set to a certain value in advance in accordance with the luminance of a subject, for example.

The first actuator 112 is an actuator that rotates the polarizing plates 110a and 110b around the optical axis as the rotation axis direction while keeping the difference between polarizing axes constant. The axis of rotation of the polarizing plates 110a and 110b caused by the first actuator 112 corresponds to the optical axis, for example. Drive of the first actuator 112 is controlled by the drive control unit 244 of the control unit 240, which will be described later.

Figure 5:
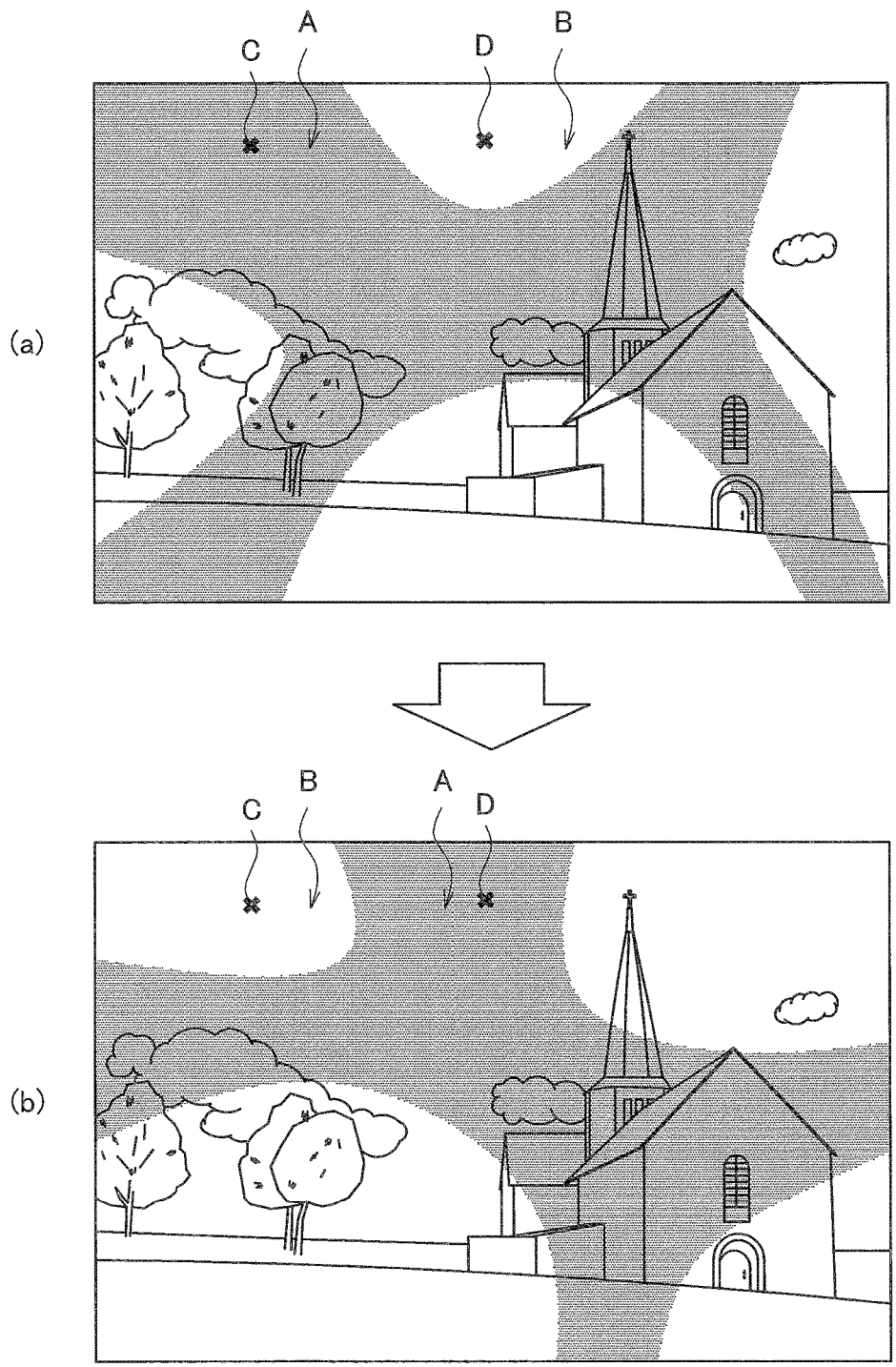
FIG. 5 shows effects of a first actuator rotating two polarizing plates.

Here, effects produced by rotation of the two polarizing plates, the polarizing plates 110a and 110b, by the first actuator 112 will be described with reference to FIG. 5. FIG. 5 shows the effects of the first actuator 112 rotating the polarizing plates 110a and 110b.

Referring to FIG. 5, as in FIG. 1, an example of a picked up image with the luminance unevenness is shown as (a). As described in the above <1. Study of ND Filter>, the luminance unevenness is caused by the in-plane variation of the transmitted light volume in the polarizing plates 110a and 110b. The in-plane variation of the transmitted light volume in the polarizing plates 110a and 110b may be caused by the geometric structure of the polarizing plates 110a and 110b. Accordingly, by relatively rotating the polarizing plates 110a and 110b with respect to the image sensor 230, as shown in (b) of FIG. 5, only the distribution of the low-luminance area A and the high-luminance area B (hereinafter also referred to as luminance unevenness distribution) can be relatively rotated around the optical axis in the picked up image.

For example, a pixel shown by a point C in FIG. 5 belongs to the low-luminance area A before rotation of the polarizing plates 110a and 110b (the state shown in (a)), but belongs to the high-luminance area B during the rotation of the polarizing plates 110a and 110b (the state shown in (b)). Similarly, for example, a pixel shown by a point D in FIG. 5 belongs to the high-luminance area B before the rotation of the polarizing plates 110a and 110b (the state shown in (a)), but belongs to the low-luminance area A during the rotation of the polarizing plates 110a and 110b (the state shown in (b)). Here, in the present embodiment, the rotation angle of the polarizing plates 110a and 110b is set in a manner that, during an exposure time in which light is emitted to the polarizing plates 110a and 110b at the time of imaging, for example, the light volume incident on the pixel shown by the point C is substantially the same as the light volume incident on the pixel shown by the point D. The light volume incident on each pixel of the image sensor 230 at the time of imaging is the integrated value of the light volume incident on each pixel during the exposure time; accordingly, the rotation of the polarizing plates 110a and 110b in this manner during the exposure time can suppress the in-plane variation of the transmitted light volume in the polarizing plates 110a and 110b and can make the light volume incident on the pixels of the image sensor 230 as uniform as possible. Accordingly, the luminance unevenness is reduced and the image quality of the picked up image is improved.

Figure 6:
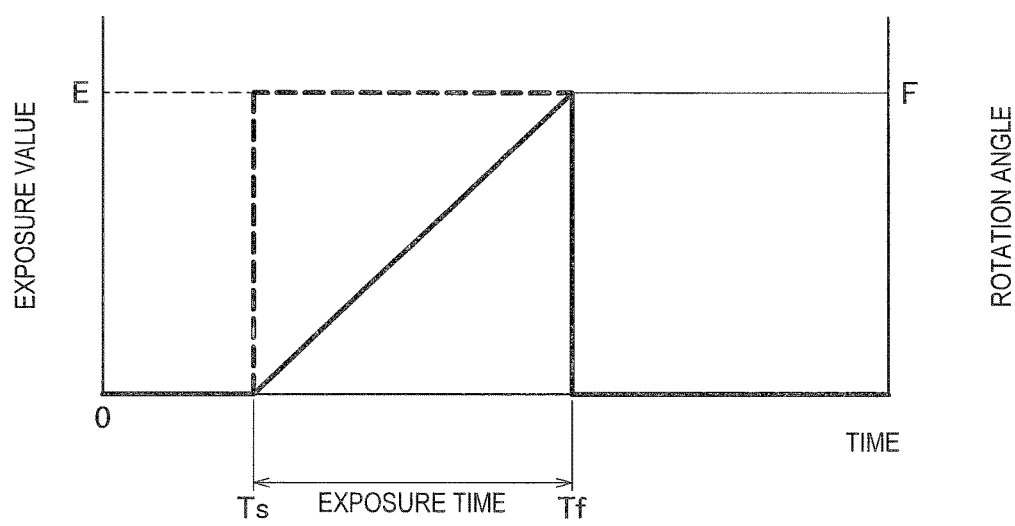
FIG. 6 is an explanation drawing for describing preferable conditions for rotation of two polarizing plates by a first actuator.

Here, preferable conditions for the rotation of the polarizing plates 110a and 110b by the first actuator 112 will be described with reference to FIG. 6. FIG. 6 is an explanation drawing for describing preferable conditions for the rotation of the polarizing plates 110a and 110b by the first actuator 112. In FIG. 6, the left vertical axis represents the exposure value and the horizontal axis represents the time to show conceptually a time change of the exposure value at the time of imaging. Further, the right vertical axis represents the rotation angle of the polarizing plates 110a and 110b caused by the first actuator 112 to show conceptually a time change of the rotation angle at the time of imaging. Note that in the following description, the rotation angle refers to the rotation angle of the polarizing plates 110a and 110b caused by the first actuator 112 unless otherwise specified.

In the example shown in FIG. 6, the exposure value at the time of imaging is assumed to be set to a certain value E. Referring to FIG. 6, the exposure value is 0 before the imaging starts. Then, the exposure value increases immediately to reach the certain value E at a time Ts when the imaging starts, is kept at the certain value E during the exposure time (that is, the imaging time), and decreases immediately to reach 0 at a time Tf when the imaging ends. In this manner, the exposure value changes over time in a step-wise manner such that the certain value E can be kept only during the exposure time. Note that the start and end of imaging can be controlled by, for example, opening and closing of a shutter with a mechanical shutter system and opening and closing of a transfer gate or a reset gate (switching between a state in which charge can be accumulated and a state in which charge is reset) in a light-receiving element of the image sensor 230 with an electronic shutter system.

On the other hand, referring to FIG. 6, the rotation angle changes over time in a manner that the rotation angle proportionally increases during the exposure time and becomes a certain angle F at the time Tf when the imaging ends. In this manner, in the present embodiment, the polarizing plates 110a and 110b can be rotated by the certain rotation angle F at a certain rotation speed during the exposure time of the imaging apparatus 20. Since the polarizing plates 110a and 110b are rotated by the certain rotation angle F at the certain rotation speed during the exposure time, the in-plane variation of the transmitted light volume in the polarizing plates 110a and 110b during the exposure time can be further reduced, and the effect of suppressing the luminance unevenness can be further obtained.

Here, the rotation angle F by which the polarizing plates 110a and 110b are rotated during the exposure time can be set so as to satisfy (the rotation angle F)=(a given angle G)×n, for example. In the formula, the given angle G is an angle that is larger than 0° and smaller than 90°, and n is a given integer other than 0. As described above with reference to FIG. 2A to FIG. 2C, in the luminance unevenness distribution, the high-luminance area A and the low-luminance area B can be generated in a period of approximately 90° in the azimuth angle. Accordingly, by setting a given angle that is larger than 0° and smaller than 90° as the given angle G, it becomes possible to realize the rotation conditions such that the light volume incident on the pixel shown by the point C becomes substantially equal to the light volume incident on the pixel shown by the point D in FIG. 5, for example.

A specific configuration of the first actuator 112 can be set so as to realize the desired rotation conditions for the rotation of the polarizing plates 110a and 110b. For example, as the first actuator 112, a two-phase ten-polar stepper motor which is used for exchange of lenses in a common imaging apparatus can be used. Here, as an example of the rotation conditions, let us consider a case in which the first actuator 112 rotates the polarizing plates 110a and 110b by the certain rotation angle at the certain rotation speed during the certain exposure time, as shown in FIG. 6. For example, in a case in which the imaging apparatus 20 is a digital video camera, the exposure time can be assumed to be 1/60 seconds, which is a shutter speed of a common digital video camera. In order to rotate the polarizing plates 110a and 110b by 90° in 1/60 seconds, for example, the polarizing plates 110a and 110b are each rotated at a rotation speed of 900 rpm=300 pps. Further, the polarizing plates 110a and 110b each have a weight of about 10 g, for example, and accordingly, it is not necessary for the first actuator 112 to have high output torque in order to cause the polarizing plates 110a and 110b to rotate. The above described two-phase ten-polar stepper motor for exchange of lenses can have such performance and can be used preferably as the first actuator 112. Further, the two-phase ten-polar stepper motor is incorporated in a common existing imaging apparatus for exchange of lenses, and accordingly, an imaging apparatus including the two-phase ten-polar stepper motor as the first actuator 112 does not have a much heavier weight than an existing imaging apparatus.

Further, as a system of shutter at the time of imaging by the imaging apparatus 20 according to the present embodiment, an electronic shutter system is preferably used. In particular, a global shutter system is more preferably used as the electronic shutter system. With a mechanical shutter system or a rolling shutter system of the electronic shutter system, the light volume incident on pixels of the image sensor 230 may be uneven depending on arrangement positions of pixels when the shutter is opened and closed. Such unevenness of the light volume incident on the pixels can cause shading and thus is not preferable in terms of suppression of the luminance unevenness. In the present embodiment, as the shutter at the time of imaging by the imaging apparatus 20, an electronic shutter system, in particular, a global shutter system is used so as to suppress the luminance unevenness (shading) due to the shutter.

The configuration of the transmitted light volume adjusting apparatus 10 according to the present embodiment has been described above. Next, another configuration of the imaging apparatus 20 will be described.

The lens 210 is an optical member that guides light incident on the image sensor 230 provided at the back stage. In the example shown in FIG. 3, the lens 210 is a spherical lens in which the front surface and the rear surface are convex lenses; however, the present embodiment is not limited to this example. For example, as the lens 210, any of various kinds of lenses may be used, such as an aspherical lens and a cylindrical lens. Further, in the example shown in FIG. 3, only the lens 210 is shown as the optical member that guides the incident light to the image sensor 230; however, the present embodiment is not limited to this example. In the inside of the imaging apparatus 20, optical members that are not shown, other than the lens 210, may be provided as appropriate, such as a mirror, a half mirror, and another lens. The kinds, numbers, arrangement positions, and the like of these optical members including the lens 210 can be designed as appropriate in consideration of a space in the housing of the imaging apparatus 20 and optical characteristics such as aberration so that the light incident on the imaging apparatus 20 can be guided to the image sensor 230 efficiently.

The OLPF 220 is an optical member having a function of shielding light in a certain frequency band. In the present embodiment, as described above, the OLPF 220 has a function of suppressing moire by being combined with the retardation plate 111b. Note that the OLPF 220 produces the effect of suppressing moire, but may decrease the resolution in a high-frequency space in a picked up image. Accordingly, in the present embodiment, depending on the kind of the subject and the usage of the imaging apparatus 20, in a case in which the generation of moire is not troublesome, the imaging apparatus 20 does not have to include the OLPF 220.

The image sensor 230 has a light-receiving surface in which light-receiving elements are arranged two-dimensionally and converts light incident on the light-receiving surface to electric signals in accordance with the light volume. The electric signals are sequentially read out for each pixel including one or more light-receiving elements, so that a picked up image in accordance with the incident light is provided. Note that in the present embodiment, there is no particular limitation on the kind of the image sensor 230, and any of various known image sensors may be used. For example, the image sensor 230 may be a complementary metal-oxide-semiconductor (CMOS) image sensor or a charge-coupled device (CCD) image sensor. The electric signals (hereinafter also referred to as image signals) obtained by the image sensor 230 for each pixel are transmitted to an image signal obtaining unit 241 of the control unit 240, which will be described later.

The control unit 240 controls various processes performed in the imaging apparatus 20. In FIG. 3, functions of the control unit 240 are shown as a functional block. Further, in FIG. 3, out of functions of the control unit 240, only functions related to the present embodiment mainly are shown, and illustration of the other functions is omitted. The control unit 240 may have known functions of a common imaging apparatus in addition to the functions shown in FIG. 3. Note that the control unit 240 may be configured by a processor such as a central processing unit (CPU) or a digital signal processor (DSP) included in the imaging apparatus 20, and each function of the control unit 240 can be realized by the processor operating in accordance with a certain program.

Functions of the control unit 240 will be described in detail. The control unit 240 includes the image signal obtaining unit 241, an image signal processing unit 242, a rotation condition setting unit 243, and the drive control unit 244.

The image signal obtaining unit 241 obtains the image signal obtained by the image sensor 230. Further, in a case in which the shutter system of the imaging apparatus 20 is an electronic shutter system, the image signal obtaining unit 241 may control timing of opening and closing of an electronic shutter in the image sensor 230 (that is, timing of reset of an image signal or reading out of an image signal in the light-receiving element in the image sensor 230) and may obtain the image signal at certain timing. For example, in a case in which the imaging apparatus 20 is a digital video camera, the image signal obtaining unit 241 obtains the image signal from the image sensor 230 continuously at timing corresponding to frames of a moving image. The image signal obtaining unit 241 provides the obtained image signal to the image signal processing unit 242.

The image signal processing unit 242 generates a picked up image by performing various kinds of image processing on the obtained image signal. Examples of the various kinds of image processing include processing of correcting a defective pixel, processing of correcting a black level, processing of correcting shading, and processing of correcting the luminance such as processing of correcting sigma. However, the signal processing performed by the image signal processing unit 242 is not limited to these examples, and the image signal processing unit 242 can perform various kinds of signal processing performed to generate a picked up image in a common existing imaging apparatus. The image signal on which the image signal processing unit 242 has performed various kinds of signal processing is transmitted to a display unit (not shown) included in the imaging apparatus 20 or an external display apparatus, for example. The display unit or the display apparatus can display the picked up image on a display screen on the basis of the image signal.

Here, out of the signal processing performed by the image signal processing unit 242, processing of correcting shading will be described in detail. In the present embodiment, as described above, by rotation of the polarizing plates 110a and 110b during the exposure time, the transmitted light volume in the polarizing plates 110a and 110b can be made uniform and the light volume incident on the pixels of the image sensor 230 can me made uniform. However, as shown in FIG. 5, the low-luminance area A in the luminance unevenness can be distributed in the X shape in the picked up image. Accordingly, even when the distribution of the luminance unevenness is rotated by rotation of the polarizing plates 110a and 110b, an area near the center of the picked up image might belong to the low-luminance area A constantly during the exposure time. In this manner, in a case in which there is the luminance unevenness as shown in FIG. 5, even when the polarizing plates 110a and 110b are rotated, there may be a difference in luminance between the area near the center of the picked up image and a peripheral area. Specifically, the luminance of the area near the center of the picked up image may be lower than the luminance of the peripheral area.

Accordingly, in the present embodiment, the image signal processing unit 242 performs shading correction processing so that the luminance near the center of the picked up image becomes substantially equal to the luminance of the peripheral area. Such shading correction processing performed by the image signal processing unit 242 can further increase the image quality of the picked up image. Note that in a common existing imaging apparatus, it is known that shading in which the luminance of an area near the center of a picked up image is higher than the luminance of a peripheral area, so that such shading correction signal processing is proposed as a known technique. The shading correction processing according to the present embodiment is to correct shading having characteristics that are opposite to those of such known shading and thus can be realized easily by applying the known technique.

Note that as a method of reducing the luminance unevenness in the X shape as shown in FIG. 5, for example, a method of performing the shading correction processing on the obtained image signal can be considered. However, the luminance unevenness generated by the in-plane variation of the transmitted light volume in the polarizing plates 110a and 110b is attributed to the geometrical structure of the polarizing plates 110a and 110b, and accordingly, the distribution can change slightly in accordance with differences between the polarizing plates 110a and 110b, for example. It is not easy to create an algorism of comprehensive signal processing that corrects such luminance unevenness having low regularity. On the other hand, in the present embodiment, by rotation of the polarizing plates 110a and 110b, caused by the first actuator 112, during the exposure time, a picked up image having a relatively simple luminance unevenness can be obtained in which the luminance of the area near the center of the picked up image is lower than the luminance of the peripheral area, for example. Accordingly, relatively easy signal processing to which a known technique is applied can produce a high quality picked up image in which the luminance unevenness is solved.

The rotation condition setting unit 243 sets conditions for the rotation of the polarizing plates 110a and 110b by the first actuator 112 (hereinafter also referred to as rotation conditions of the polarizing plates 110a and 110b). Here, the rotation conditions of the polarizing plates 110a and 110b may be the rotation speed and the rotation angle of the polarizing plates 110a and 110b during the exposure time, for example. The rotation condition setting unit 243 can set rotation conditions shown in FIG. 6, for example, as the rotation conditions of the polarizing plates 110a and 110b. Further, the rotation condition setting unit 243 may set conditions for the rotation of the polarizing plate 110b by the second actuator 113 (hereinafter also referred to as rotation conditions of the polarizing plate 110b). Here, the rotation conditions of the polarizing plate 110b may be the rotation angle of the polarizing plate 110b with respect to the polarizing plate 110a, that is, the difference between polarizing axes of the polarizing plates 110a and 110b, for example. The rotation condition setting unit 243 can set, as the rotation conditions of the polarizing plate 110b, the rotation angle of the polarizing plate 110b with respect to the polarizing plate 110a such that the transmittance of light in the polarizing plates 110a and 110b becomes a certain transmittance in accordance with the luminance of the subject. The rotation condition setting unit 243 provides information on the set rotation conditions of the polarizing plates 110a and 110b and information on the set rotation conditions of the polarizing plate 110b to the drive control unit 244.

The drive control unit 244 controls the drive of the first actuator 112. Specifically, the drive control unit 244 drives the first actuator 112 on the basis of the rotation conditions of the polarizing plates 110a and 110b set by the rotation condition setting unit 243, thereby rotating the polarizing plates 110a and 110b around the optical axis direction as the rotation axis direction. Further, the drive control unit 244 may control the drive of the second actuator 113. Specifically, the drive control unit 244 drives the second actuator 113 on the basis of the rotation conditions of the polarizing plate 110b set by the rotation condition setting unit 243, thereby rotating the polarizing plate 110b around the optical axis direction as the rotation axis direction and adjusting the difference between polarizing axes of the polarizing plate 110a and the polarizing plate 110b.

The configurations of the transmitted light volume adjusting apparatus 10 and the imaging apparatus 20 including the transmitted light volume adjusting apparatus 10 according to the present embodiment have been described above with reference to FIG. 3. As described above, in the present embodiment, the first actuator 112 rotates the polarizing plates 110a and 110b around the optical axis direction as the rotation axis direction during the exposure time while keeping the difference between polarizing axes of the polarizing plates 110a and 110b constant. Accordingly, the in-plane variation of the transmittance of light in the polarizing plates 110a and 110b is suppressed during the exposure time. Further, accordingly, the luminance unevenness in the picked up image is suppressed and the image quality of the picked up image is increased.

Further, in the present embodiment, the second actuator 113 rotates the polarizing plate 110b around the optical axis direction as the rotation axis direction, thereby changing the difference between polarizing axes of the polarizing plate 110a and the polarizing plate 110b. The change in the difference between polarizing axes of the polarizing plate 110a and the polarizing plate 110b adjusts the transmittance of light in the polarizing plates 110a and 110b, and accordingly, imaging with a proper incident light volume in accordance with the subject and the usage of the imaging apparatus 20 becomes possible.

Here, the color unevenness in the picked up image can be generated by variation in polarizing directions of light incident on the polarizing plate 110a. As described above, in the present embodiment, the first actuator 112 rotates the polarizing plates 110a and 110b around the optical axis direction as the rotation axis direction during the exposure time while keeping the difference between polarizing axes of the polarizing plates 110a and 110b constant. Accordingly, the polarizing direction of light transmitted in the polarizing plate 110a may change during the exposure time and light having various polarizing directions may be incident on the polarizing plate 110a, and accordingly, an effect of reducing the color unevenness can be obtained. Further, in this example, the retardation plate 111a provided at the front stage of the polarizing plate 110a can cancel the polarization of light incident on the polarizing plate 110a. Furthermore, in the present embodiment, when the transmitted light volume in the polarizing plates 110a and 110b is adjusted by changing the difference between polarizing axes, the second actuator 113 rotates the polarizing plate 110b provided at the back stage. Accordingly, the effect of reducing the color unevenness can be further obtained.

3. MODIFICATION EXAMPLES

Next, some modification examples in the present embodiment will be described. Note that in the following description of the modification examples of the present embodiment, differences from the imaging apparatus 20 described in the above <2. Configuration of Apparatus> will be mainly described, and a detailed description of common structures will be omitted.

3-1. Modification Example of Polarizing Plate Having Curvature

Figure 7:
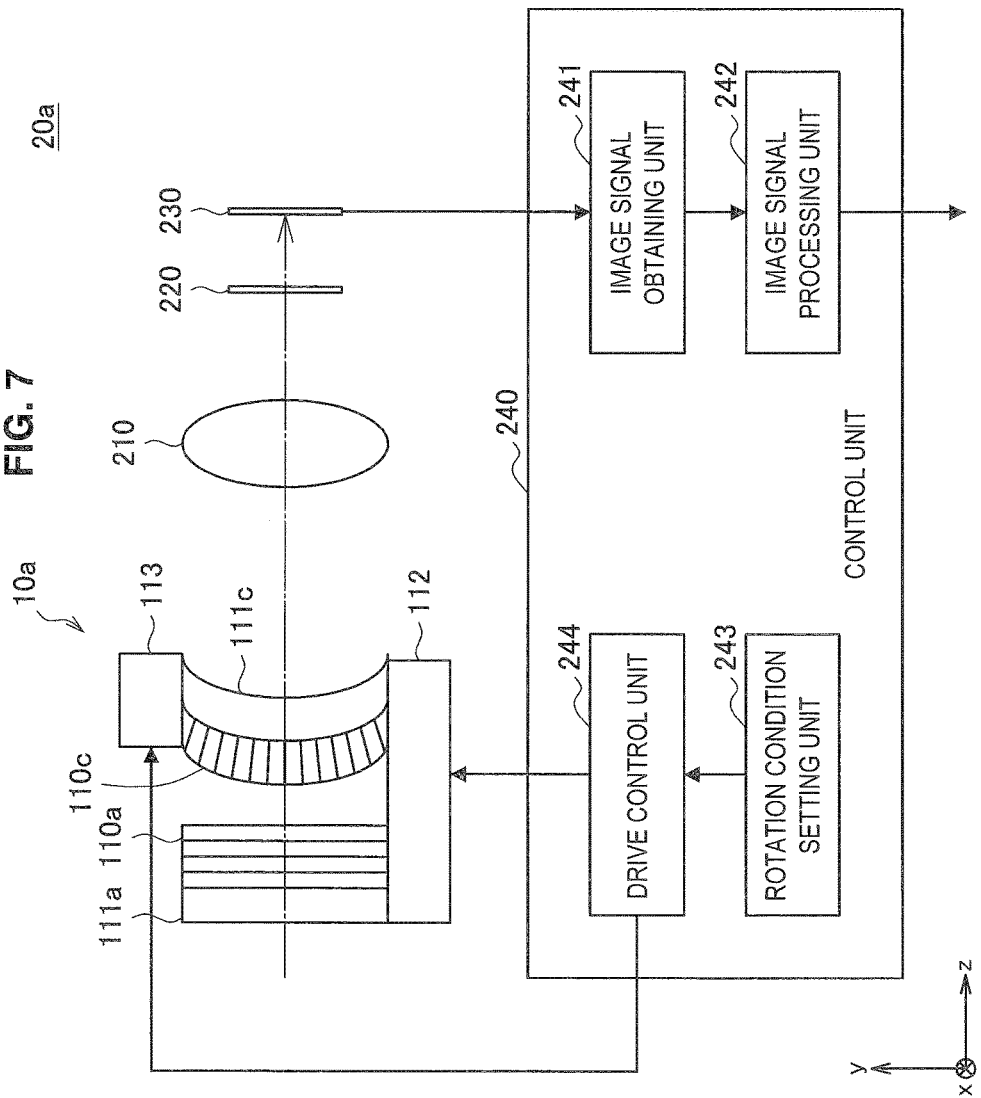
FIG. 7 is a schematic view showing a configuration example of an imaging apparatus according to a modification example in which polarizing plates of a transmitted light volume adjusting apparatus have a curvature.

First, as a modification example of the present embodiment, a modification example in which the polarizing plates of the transmitted light volume adjusting apparatus have a curvature will be described with reference to FIG. 7. FIG. 7 is a schematic view showing a configuration example of an imaging apparatus according to the modification example in which the polarizing plates of the transmitted light volume adjusting apparatus have a curvature.

Referring to FIG. 7, an imaging apparatus 20a according to this modification example includes a transmitted light volume adjusting apparatus 10a, the lens 210, the OLPF 220, the image sensor 230, and the control unit 240. Further, the transmitted light volume adjusting apparatus 10a includes the polarizing plate 110a, a polarizing plate 110c, the retardation plate 111a, a retardation plate 111c, the first actuator 112, and the second actuator 113. Note that the imaging apparatus 20a according to this modification example corresponds to the imaging apparatus 20 described in the above <2. Configuration of Apparatus> in which the structures of the polarizing plate 110b and the retardation plate 111b (that is, the polarizing plate and the retardation plate closer to the image sensor 230) in the transmitted light volume adjusting apparatus 10 are different. The other structural members are the same as those in the above described imaging apparatus 20, and therefore, a detailed description thereof is omitted.

In this modification example, in the transmitted light volume adjusting apparatus 10a, the polarizing plate 110c and the retardation plate 111c provided closer to the image sensor 230 each have a certain curvature. The curvature of the polarizing plate 110c and the retardation plate 111c may be designed in accordance with the curvature of the lens 210. For example, the curvature of the polarizing plate 110c and the retardation plate 111c may be substantially equal to the curvature of the lens 210. As described above, the in-plane variation of the transmittance of light in the polarizing plate 110a and 110c, which can cause the luminance unevenness shown in FIG. 1 for example, is dependent on the incident angle of the polarizing plate 110a and 110c. In this modification example, since the polarizing plate 110c has a curvature, dependence of the transmittance of light in the polarizing plate 110c on the incident angle can be reduced, and the luminance unevenness can be further suppressed.

Here, the curvature of the polarizing plate 110c and the retardation plate 111c will be described in detail. As described above, the curvature of the polarizing plate 110c and the retardation plate 111c can be set in accordance with the curvature of the lens 210. Here, a case in which the lens 210 is a lens that changes the incident angle of light, such as a zoom lens, will be considered. In this case, the curvature of the polarizing plate 110c and the retardation plate 111c is desirably designed in consideration of the incident angle in the lens 210 on a wide side. For example, specifically, let us consider a case of using, as the lens 210, a lens in which the focal length can be changed from 18 mm to 200 mm for the imaging apparatus 20 including the image sensor 230 having a so-called APS-C size. The incident angles of light at the respective focal lengths are as follows: 38° when the focal length is 18 mm and 4° when the focal length is 200 mm. In this case, it is considered that the in-plane variation of the transmittance of light in the polarizing plates 110a and 110c becomes most obvious when the focal length is 18 mm, which is on the wide side, and accordingly, it is desirable to design the curvature of the polarizing plate 110c and the retardation plate 111c so as to correspond to the incident angle of 38° obtained when the focal length is 18 mm. Here, in a case in which the curvature of the polarizing plate 110c and the retardation plate 111 is designed in consideration of the incident angle on the wide side, the dependence of the transmittance on the incident angle may be increased on the tele side; however, in general, the picked up image has a lower luminance on the tele side than on the wide side. Accordingly, there is no considerable problem because the polarizing plates 110a and 110c are not often used in a crossed nicol state on the tele side and the frequency of generation of the luminance unevenness is considered to be low.

However, in a case of imaging a subject that is distant and has a relatively high luminance, such as a case of observing an eclipse of the sun, it is desirable to design the curvature of the polarizing plate 110c and the retardation plate 111c on the assumption of the incident angle on the tele side. In a case in which the light incident angle in the lens 210 can change in this manner, the curvature of the polarizing plate 110c and the retardation plate 111c in this modification example can be set as appropriate in consideration of the incident angle on the wide side or the tele side in accordance with the luminance of the subject or the usage of the imaging apparatus 20.

In the imaging apparatus 20a, the incident angle of light on the lens can change at any time in accordance with a usage thereof, such as a case of replacing a lens that is attached to the outer surface of a lens-barrel. Accordingly, the transmitted light volume adjusting apparatus 10a according to this modification example may include a curvature changeable mechanism which dynamically changes the curvature of the polarizing plate 110c and the retardation plate 111c. Further, the curvature changeable mechanism may change as appropriate the curvature of the polarizing plate 110c and the retardation plate 111c in accordance with the curvature of the lens used for the imaging apparatus 20a. Such a curvature changeable mechanism can be achieved by forming the polarizing plate 110c and the retardation plate 111c on a substrate of which the curvature can be changed freely by a fine actuator such as one used for micro electro mechanical systems (MEMS).

Note that in the example shown in FIG. 7, out of the polarizing plates 110a and 110c and the retardation plates 111a and 111c, the polarizing plate 110c and the retardation plate 111c provided closer to the image sensor 230 have the curvature; however, this modification example is not limited to this example. In this modification example, at least one of the polarizing plate 110a and the polarizing plate 110c has a curvature. For example, the polarizing plate 110c and the retardation plate 111c may be planar and the polarizing plate 110a and the retardation plate 111a, which are provided closer to the subject, may have a curvature. Further, all of the polarizing plates 110a and 110c and the retardation plates 111a and 111c may have a curvature. Further, at least one of the polarizing plate 110a and the polarizing plate 110c may have a curvature and the retardation plates 111a and 111c may be planar. In such a structure, as described above, the dependence of transmittance of light on the incident angle can be reduced in the polarizing plate 110a and the polarizing plate 110c and the effect of further suppressing the luminance unevenness can be obtained.

Figure 8:
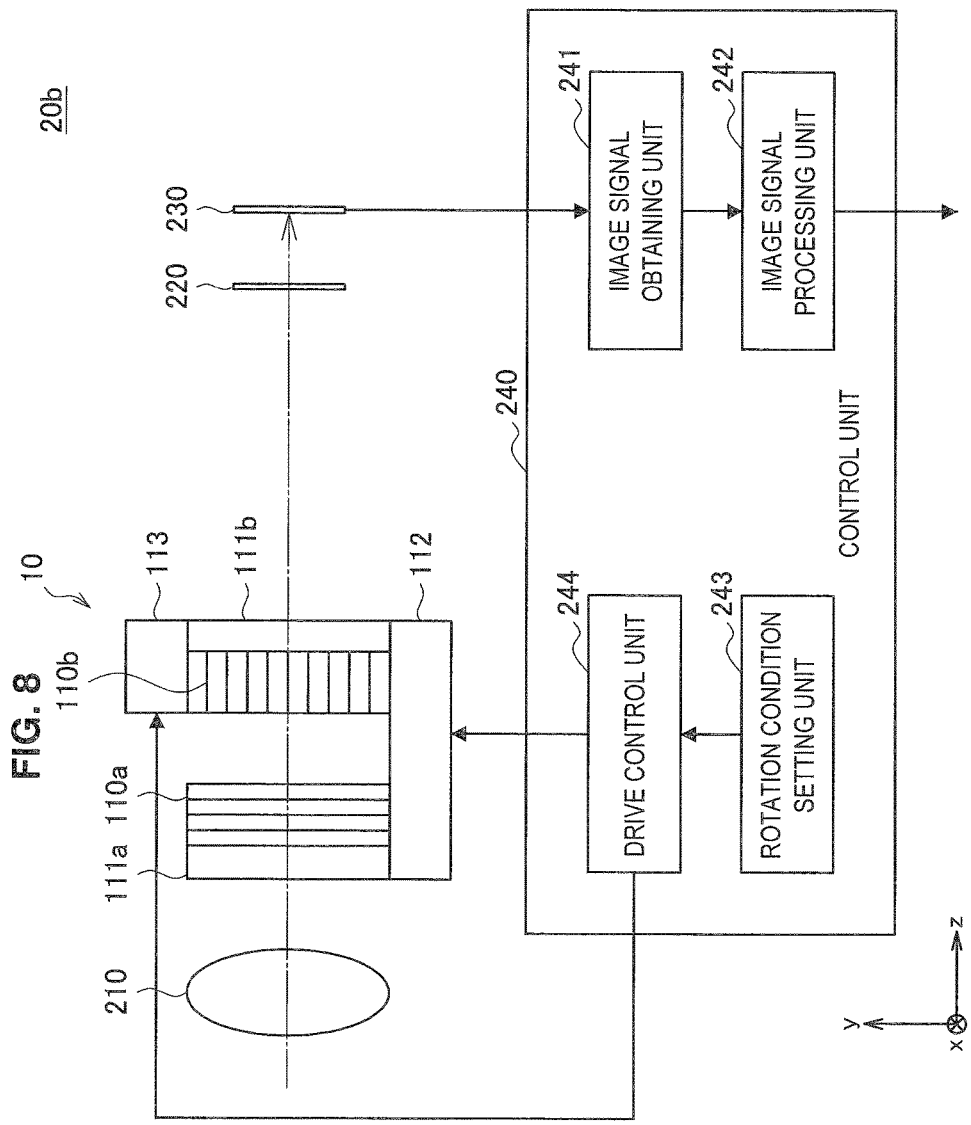
FIG. 8 is a schematic diagram showing a configuration example of an imaging apparatus according to a modification example in which the arrangement of component members on an optical axis is different.
Figure 9:
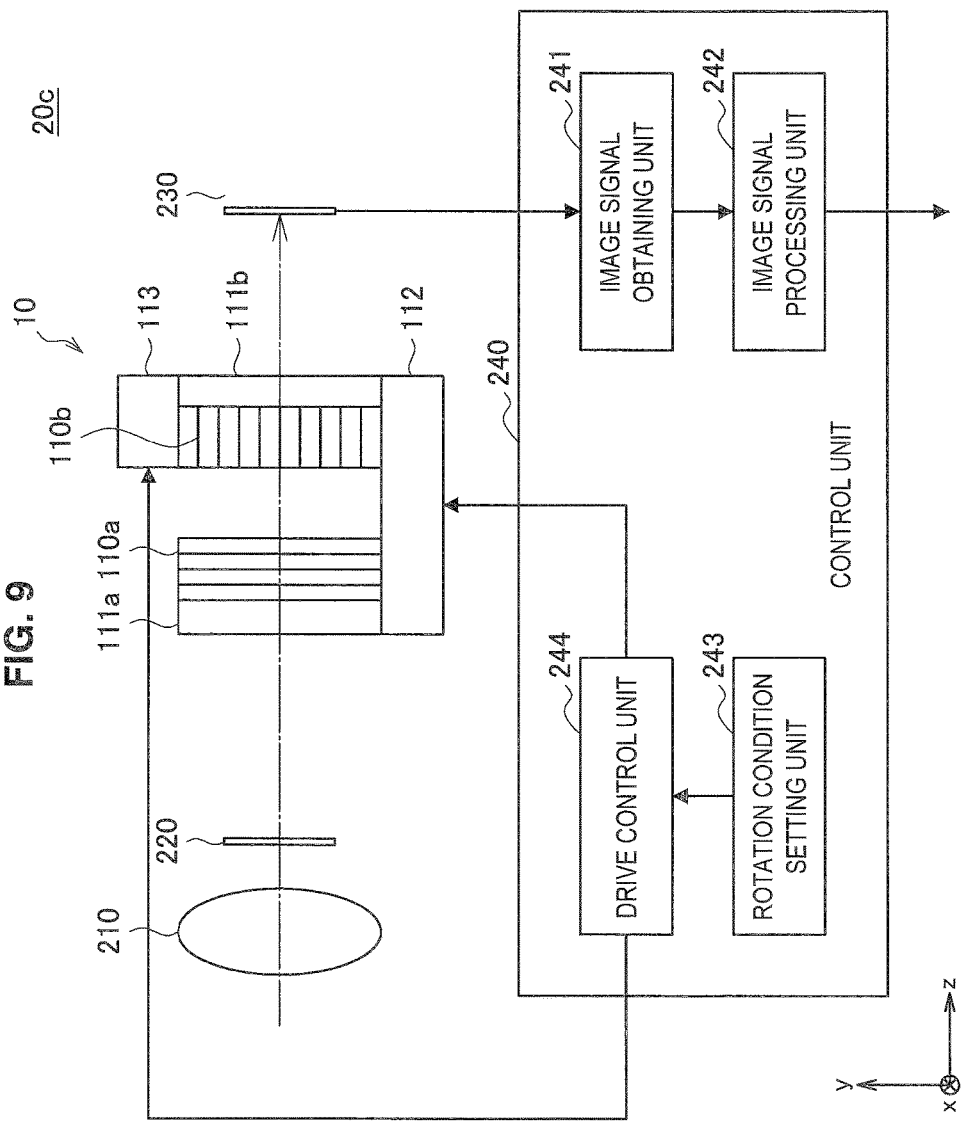
FIG. 9 is a schematic diagram showing a configuration example of an imaging apparatus according to a modification example in which the arrangement of component members on an optical axis is different.

3-2. Modification Example of Component Members Having Different Arrangement on Optical Axis Next, as a modification example of the present embodiment, a modification example in which the arrangement of component members on the optical axis in the imaging apparatus is different will be described with reference to FIG. 8 to FIG. 10. FIG. 8 to FIG. 10 are each a schematic diagram showing a configuration example of an imaging apparatus according to the modification example in which the arrangement of component members on the optical axis is different.

FIG. 8 shows a configuration example of the imaging apparatus according to this modification example. Referring to FIG. 8, an imaging apparatus 20b according to this modification example includes the transmitted light volume adjusting apparatus 10, the lens 210, the OLPF 220, the image sensor 230, and the control unit 240. Further, the transmitted light volume adjusting apparatus 10 includes the polarizing plates 110a and 110b, the retardation plates 111a and 111b, the first actuator 112, and the second actuator 113. In the imaging apparatus 20b according to this modification example, the arrangement of component members on the optical axis of the component members is different from that in the imaging apparatus 20 described in the above <2. Configuration of Apparatus>. Specifically, in the imaging apparatus 20b, the lens 210, the transmitted light volume adjusting apparatus 10, the OLPF 220, and the image sensor 230 are arranged in this order on the optical axis. In this manner, in a case in which the transmitted light volume adjusting apparatus 10 is disposed between the lens 210 and the OLPF 220, the effect of suppressing the in-plane variation of the transmitted light volume can be obtained in the same manner as the imaging apparatus 20 described in the above <2. Configuration of Apparatus>.

FIG. 9 shows another configuration example of an imaging apparatus according to this modification example. Referring to FIG. 9, an imaging apparatus 20c according to this modification example includes the transmitted light volume adjusting apparatus 10, the lens 210, the OLPF 220, the image sensor 230, and the control unit 240. Further, the transmitted light volume adjusting apparatus 10 includes the polarizing plates 110a and 110b, the retardation plates 111a and 111b, the first actuator 112, and the second actuator 113. In the imaging apparatus 20c according to this modification example, the arrangement of component members on the optical axis of the component members is different from that in the imaging apparatus 20 described in the above <2. Configuration of Apparatus>. Specifically, in the imaging apparatus 20c, the lens 210, the OLPF 220, the transmitted light volume adjusting apparatus 10, and the image sensor 230 are arranged in this order on the optical axis. In this manner, in a case in which the transmitted light volume adjusting apparatus 10 is disposed between the OLPF 220 and the image sensor 230, the same effect of suppressing the in-plane variation of the transmitted light volume as described in the above <2. Configuration of Apparatus> can be obtained.

FIG. 10 shows still another configuration example of an imaging apparatus according to this modification example. Referring to FIG. 10, an imaging apparatus 20d according to this modification example includes the transmitted light volume adjusting apparatus 10, the OLPF 220, the image sensor 230, the control unit 240, and a lens-barrel 250. Further, the transmitted light volume adjusting apparatus 10 includes the polarizing plates 110a and 110b, the retardation plates 111a and 111b, the first actuator 112, and the second actuator 113. In this modification example, the transmitted light volume adjusting apparatus 10 is disposed in the inside of the lens-barrel 250. Further, on the incident side and the output side of the light of the lens-barrel 250, an incident lens 251 and an output lens 252 are disposed, respectively. Optical characteristics of the incident lens 251 and the output lens 252 are adjusted in a manner that incident light on the imaging apparatus 20d has the same optical path as the lens 210 shown in FIG. 3, for example.

As shown in FIG. 10, in the imaging apparatus 20d according to this modification example, the incident lens 251, the transmitted light volume adjusting apparatus 10, the output lens 252, the OLPF 220, and the image sensor 230 are arranged in this order on the optical axis. In a case in which the transmitted light volume adjusting apparatus 10 is disposed in the inside of the lens-barrel 250 in this manner, the same effect of suppressing the in-plane variation of the transmitted light volume as described in the above <2. Configuration of Apparatus> can be obtained. Note that in the configuration example shown in FIG. 10, in the inside of the lens-barrel 250, the transmitted light volume adjusting apparatus 10 may be provided instead of an iris mechanism at a position where the iris mechanism is generally provided, for example. In this manner, in this modification example, the use of the transmitted light volume adjusting apparatus 10 instead of the iris mechanism can reduce the component members in the imaging apparatus 20d, which may lead to a reduction in weight and manufacturing cost of the imaging apparatus 20d.

Modification examples in which the arrangement of component members on the optical axis in the imaging apparatus is different have been described above with reference to FIG. 8 to FIG. 10 as modification examples of the present embodiment. As described above, in the present embodiment, the position of the transmitted light volume adjusting apparatus 10 is not limited on the optical axis. The transmitted light volume adjusting apparatus 10 can be disposed at any position to suppress the in-plane variation of the transmitted light volume in the polarizing plates 110a and 110b and to produce the effect of suppressing the luminance unevenness of a picked up image. The transmitted light volume adjusting apparatus 10 may be disposed in the inside of the imaging apparatus as one of the component members of the imaging apparatus, or may be disposed outside the imaging apparatus as another apparatus different from the imaging apparatus, such as a peripheral apparatus of the imaging apparatus, at the front stage of an objective lens, for example.

3-3. Modification Example of Optical Axis and Polarizing Plate Having Different Rotation Axis Next, a modification example in which the optical axis differs from the rotation axis of the polarizing plate will be described as a modification example of the present embodiment. As described in the above <2. Configuration of Apparatus>, in the present embodiment, the polarizing plates 110a and 110b of the transmitted light volume adjusting apparatus 10 are rotated around the optical axis direction as the rotation axis direction. Here, the optical axis can be defined as a straight line that passes through the curvature center of the front surface and the rear surface of the lens 210 shown in FIG. 3, for example. In the present embodiment, the rotation axis of the polarizing plates 110a and 110b may or may not correspond to the optical axis. In a case in which the rotation axis of the polarizing plates 110a and 110b does not correspond to the optical axis, the rotation axis of the polarizing plates 110a and 110b can be defined as an axis that is parallel to the optical axis and has an intersection point different from that of the optical axis on a plane regulated by the x-axis and the y-axis (x-y plane).

FIG. 11 shows examples of the relation between the optical axis and the rotation axis of the polarizing plates 110a and 110b according to the present embodiment. In FIG. 11, patterns of the relation between the optical axis and the rotation axis of the polarizing plates 110a and 110b are shown in a form of a table.

First, in a pattern A, the optical axis, the rotation axis of the polarizing plate 110a, and the rotation axis of the polarizing plate 110b correspond to one another. This corresponds to the embodiment described above with reference to FIG. 3, for example.

In patterns B to E, among the optical axis, the rotation axis of the polarizing plate 110a, and the rotation axis of the polarizing plate 110b, at least one axis does not correspond to the other axes. In the pattern B, the optical axis corresponds to the rotation axis of the polarizing plate 110a, but the rotation axis of the polarizing plate 110b does not correspond to the optical axis and the rotation axis of the polarizing plate 110a. In the pattern C, the optical axis corresponds to the rotation axis of the polarizing plate 110b, but the rotation axis of the polarizing plate 110a does not correspond to the optical axis and the rotation axis of the polarizing plate 110b. In the pattern D, the rotation axis of the polarizing plate 110a corresponds to the rotation axis of the polarizing plate 110b, but the optical axis does not correspond to the rotation axis of the polarizing plate 110a and the rotation axis of the polarizing plate 110b. In the pattern E, the optical axis, the rotation axis of the polarizing plate 110a, and the rotation axis of the polarizing plate 110b do not correspond to one another.

In the present embodiment, even in a case in which at least one axis does not correspond to the other axes among the optical axis, the rotation axis of the polarizing plate 110a, and the polarizing plate 110b, such as in the patterns B to E, the effect of suppressing the luminance unevenness can be obtained. For example, in a case in which the optical axis does not correspond to the rotation axes of the polarizing plates 110a and 110b, the rotation center in rotation of the distribution of the luminance unevenness shown in FIG. 5 differs from the center of the picked up image. However, even in such a circumstance, the rotation of the polarizing plates 110a and 110b suppresses the in-plane variation of the transmitted light volume in the polarizing plates 110a and 110b, and accordingly, the luminance unevenness in the picked up image can be suppressed.

As described above, in the present embodiment, even in a case in which the optical axis, the rotation axis of the polarizing plate 110a, and the rotation axis of the polarizing plate 110b do not correspond to one another, the effects of suppressing the in-plane variation of the transmitted light volume in the polarizing plates 110a and 110b and of suppressing the luminance unevenness in the picked up image can be obtained. Since the design does not need consideration of the correspondence of the optical axis, the rotation axis of the polarizing plate 110a, and the rotation axis of the polarizing plate 110b when the component members are arranged in the imaging apparatus 20, the degree of freedom in design related to the arrangement of the component members can be increased.

3-4. Modification Example of Different Method of Setting Rotation Conditions Next, a modification example in which a method of setting conditions for rotating a polarizing plate in a transmitted light volume adjusting apparatus is different will be described as a modification example of the present embodiment with reference to FIG. 12. FIG. 12 is a schematic diagram of a configuration example of an imaging apparatus according to a modification example in which a method of setting conditions for rotating a polarizing plate in a transmitted light volume adjusting apparatus is different.

Referring to FIG. 12, an imaging apparatus 20e according to this modification example includes the transmitted light volume adjusting apparatus 10, the lens 210, the OLPF 220, the image sensor 230, and a control unit 260. Further, the transmitted light volume adjusting apparatus 10 includes the polarizing plates 110a and 110b, the retardation plates 111a and 111b, the first actuator 112, and the second actuator 113. Note that the imaging apparatus 20e according to this modification example corresponds to the imaging apparatus 20 described in the above <2. Configuration of Apparatus> including the control unit 260 instead of the control unit 240. The other component members are the same as those in the above described imaging apparatus 20, and therefore a detailed description thereof is omitted.

The control unit 260 controls various processes performed in the imaging apparatus 20e. In FIG. 12, out of functions of the control unit 260, only functions related to this modification example mainly are shown, and illustration of other functions is omitted. The control unit 260 may have known functions of a common imaging apparatus in addition to the functions shown in FIG. 12. Note that the control unit 260 may be configured by a processor such as a CPU or a DSP included in the imaging apparatus 20e, and each function of the control unit 260 can be realized by the processor operating in accordance with a certain program.

The control unit 260 includes the image signal obtaining unit 241, the image signal processing unit 242, an incident light volume calculating unit 265, a rotation condition calculating unit 263, and the drive control unit 244. Note that out of the functions of the control unit 260, the image signal obtaining unit 241, the image signal processing unit 242, and the drive control unit 244 are the same as the image signal obtaining unit 241, the image signal processing unit 242, and the drive control unit 244 shown in FIG. 3, and therefore a detailed description thereof is omitted.

In this modification example, an image signal obtained by the image signal obtaining unit 241 is provided to the incident light volume calculating unit 265. The incident light volume calculating unit 265 calculates the integrated value of the incident light volume, incident on the pixels of the image sensor 230, for each pixel. The incident light volume calculating unit 265 can calculate the integrated value of the incident light volume for each pixel on the basis of the signal intensity of the image signal outputted from each light-receiving element of the image sensor 230, for example. Note that the incident light volume calculating unit 265 does not have to calculate the integrated value of the incident light volume for every pixel of the image sensor 230, and may calculate the integrated value of the incident light volume for representative pixels, such as the point C and the point D shown in FIG. 5, which belong to both the low-luminance region A and the high-luminance region B when the distribution of the luminance unevenness is rotated. The incident light volume calculating unit 265 provides information on the calculated integrated value of the incident light volume for each pixel to the rotation condition calculating unit 263.

The rotation condition calculating unit 263 calculates and sets rotation conditions of the polarizing plates 110a and 110b on the basis of the integrated value of the incident light volume for each pixel, the integrated value being calculated by the incident light volume calculating unit 265. For example, the rotation condition calculating unit 263 calculates such a rotation speed and a rotation angle that the respective pixels have substantially the same integrated value of the incident light volume for each pixel, the integrated value being calculated by the incident light volume calculating unit 265, and sets the calculated rotation speed and rotation angle as rotation conditions of the polarizing plates 110a and 110b. Here, as described above, since the transmittance of light in the polarizing plates 110a and 110b tends to have a periodicity represented as 45(°)+90 (°)×n (n is a given integer) with respect to the azimuth angle, the integrated value of the incident light volume for each pixel also has a periodicity with respect to the rotation angle of the polarizing plates 110a and 110b. Considering such a periodicity, the rotation condition calculating unit 263 may assume such a rotation speed and rotation angle that the respective pixels have substantially the same integrated value of the incident light volume for each pixel during the exposure time. The rotation condition calculating unit 263 sets the calculated rotation speed and rotation angle as the rotation conditions of the polarizing plates 110a and 110b and provides the calculated rotation speed and rotation angle to the drive control unit 244. The drive control unit 244 can drive the first actuator 112 on the basis of the rotation conditions.

Note that in this modification example, the rotation condition calculating unit 263 may set certain conditions that are set in advance as the rotation conditions of the polarizing plates 110a and 110b immediately after imaging starts. On the basis of the rotation conditions, the drive control unit 244 drives the first actuator 112, and after rotation of the polarizing plates 110a and 110b starts, the incident light volume calculating unit 265 may calculate the integrated value of the incident light volume for each pixel and on the basis of the calculation results, the rotation condition calculating unit 263 may update conditions for the rotation of the polarizing plates 110a and 110b. The rotation condition calculating unit 263 may update conditions for the rotation of the polarizing plates 110a and 110b dynamically during one-time imaging (during exposure) in a case in which the exposure time is sufficiently long relative to the time for calculating the rotation conditions (that is, in a case in which the shutter speed is sufficiently low). Alternatively, the update may be switched according to imaging (exposure) in a case in which the exposure time is comparatively short relative to the time for calculating the rotation conditions (that is, in a case in which the shutter speed is comparatively high).

As described above with reference to FIG. 12, in this modification example, the incident light volume calculating unit 265 calculates, for each pixel, the integrated value of the incident light volume which is incident on the pixels of the image sensor 230 during the exposure time. Then, on the basis of the integrated value of the incident light volume for each pixel, the integrated value being calculated by the incident light volume calculating unit 265, rotation condition calculating unit 263 calculates and sets the conditions for the rotation of the polarizing plates 110a and 110b by the first actuator 112. Here, in the embodiment described in the above <2. Configuration of Apparatus>, the conditions for the rotation of the polarizing plates 110a and 110b by the first actuator 112 are set in advance by the rotation condition setting unit 243. In contrast, in this modification example, the provision of the incident light volume calculating unit 265 and the rotation condition calculating unit 263 enables real-time change of the rotation conditions in accordance with a light-receiving status of each pixel in the exposure time, and accordingly, the in-plane variation of the transmittance in the polarizing plates 110a and 110b can be further suppressed and a picked up image having higher quality can be obtained.

4. SUPPLEMENTARY EXPLANATION

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

For example, the above embodiment has shown a case in which the transmitted light volume adjusting apparatus is used for an imaging apparatus; however, the present technology is not limited to this example. The transmitted light volume adjusting apparatus according to the present embodiment can be used for any other apparatus having a function of detecting light on a plane, such as a light detector in a light sensor. In the transmitted light volume adjusting apparatus according to the present embodiment, the in-plane variation of the transmitted light volume is suppressed. Therefore, by disposing the transmitted light volume adjusting apparatus at the front stage of a light detection plane on the optical axis of an apparatus having a function of detecting light on a plane, the luminance unevenness on the light detection plane is solved and the accuracy of detecting light is increased.

Further, for example, the above embodiment has shown a case in which the transmitted light volume adjusting apparatus includes two polarizing plates; however, the present technology is not limited to this example. The transmitted light volume adjusting apparatus may include three or more polarizing plates. Also in a case in which the transmitted light volume adjusting apparatus includes three or more polarizing plates, a first actuator rotates the plurality of polarizing plates around an optical axis direction as the rotation axis direction, and accordingly, the effect of suppressing the in-plane variation of the transmitted light volume in the polarizing plate can be obtained.

Further, for example, the above embodiment has shown a case in which, in the transmitted light volume adjusting apparatus, the difference between polarizing axes of two polarizing plates is kept constant when the first actuator rotates the two polarizing plates; however, the present technology is not limited to this example. In the present embodiment, the first actuator may rotate the two polarizing plates while the second actuator changes the difference between polarizing axes. Also in a case in which the two polarizing plates are rotated while the difference between polarizing axes is changed, by setting conditions for the rotation of one of the polarizing plate by the second actuator and conditions for the rotation of the both polarizing plates by the first actuator, it becomes possible to average the in-plane transmitted light volume of light incident on the polarizing plates during the rotation and to obtain the effect of suppressing the in-plane variation of the transmitted light volume.

Additionally, the present technology may also be configured as below:

(1) A transmitted light volume adjusting apparatus including:

a first polarizing plate provided on an optical axis, the first polarizing plate being configured to transmit light in a first polarizing direction;

a second polarizing plate provided on the optical axis at a back stage of the first polarizing plate, the second polarizing plate being configured to transmit light in a second polarizing direction; and a first actuator configured to rotate the first polarizing plate and the second polarizing plate around a direction of the optical axis as a rotation axis direction in a state in which a difference between polarizing axes, which is an angle formed by the first polarizing direction and the second polarizing direction, is kept constant.

(2) The transmitted light volume adjusting apparatus according to (1), further including:

a second actuator configured to change the difference between polarizing axes by rotating at least one of the first polarizing plate and the second polarizing plate around the direction of the optical axis as the rotation axis direction.

(3) The transmitted light volume adjusting apparatus according to (1) or (2), wherein the first actuator rotates the first polarizing plate and the second polarizing plate by a certain rotation angle at a certain speed during an exposure time when light is emitted on the first polarizing plate and the second polarizing plate.

(4) The transmitted light volume adjusting apparatus according to (3), wherein the certain rotation angle is n (n is a given integer other than 0) times as large as a given angle that is larger than 0° and smaller than 90°.

(5) The transmitted light volume adjusting apparatus according to any one of (1) to (4), wherein at least one of the first polarizing plate and the second polarizing plate has a curved surface having a certain curvature.

(6) The transmitted light volume adjusting apparatus according to any one of (1) to (5), wherein the transmitted light volume adjusting apparatus is provided in a light path of an imaging apparatus, through which light from a subject travels toward an image sensor, and wherein the imaging apparatus includes a lens configured to guide the light from the subject to the image sensor, at a front stage or a back stage of the transmitted light volume adjusting apparatus.

(7) The transmitted light volume adjusting apparatus according to (6),
wherein the lens has an optical axis corresponding to at least one of axes of rotation of the first polarizing plate and the second polarizing plate, the rotation being caused by the first actuator.

(8) The transmitted light volume adjusting apparatus according to (7),
wherein the optical axis of the lens corresponds to the axes of rotation of the first polarizing plate and the second polarizing plate, the rotation being caused by the first actuator.

(9) The transmitted light volume adjusting apparatus according to any one of (6) to (8), wherein at least one of the first polarizing plate and the second polarizing plate has a curved surface having a certain curvature in accordance with a curvature of the lens.

(10) The transmitted light volume adjusting apparatus according to (9),
wherein the curvature of the curved surface of at least one of the first polarizing plate and the second polarizing plate is substantially equal to the curvature of the lens.

(11) The transmitted light volume adjusting apparatus according to (9) or (10), further including:
a curvature changeable mechanism configured to change the curvature of the curved surface of at least one of the first polarizing plate and the second polarizing plate in accordance with the curvature of the lens.

(12) The transmitted light volume adjusting apparatus according to any one of (6) to (11), wherein the imaging apparatus is of an electronic shutter system.

(13) The transmitted light volume adjusting apparatus according to any one of (1) to (12), wherein each of the first polarizing plate and the second polarizing plate has a structure in which polyvinyl alcohol (PVA) including at least an iodine-based material is interposed between films formed from triacetylcellulose (TAC).

(14) A transmitted light volume adjusting method including:
rotating a first polarizing plate provided on an optical axis, the first polarizing plate being configured to transmit light in a first polarizing direction, and a second polarizing plate provided on the optical axis at a back stage of the first polarizing plate, the second polarizing plate being configured to transmit light in a second polarizing direction, around a direction of the optical axis as a rotation axis direction in a state in which a difference between polarizing axes, which is an angle formed by the first polarizing direction and the second polarizing direction, is kept constant.

What is claimed is:
1. A transmitted light volume adjusting apparatus, comprising:
a first polarizing plate on a first optical axis of an incident light, wherein the first polarizing plate is configured to transmit the incident light in a first polarization direction;
a second polarizing plate on the first optical axis of the incident light at a side of the first polarizing plate opposite to a subject side of the first polarizing plate, wherein the second polarizing plate is configured to transmit the incident light in a second polarization direction;
an actuator configured to rotate the first polarizing plate and the second polarizing plate around the first optical axis of the incident light as a rotational axis, based on a difference between a first polarization axis of the first polarizing plate and a second polarization axis of the second polarizing plate,
wherein the difference between the first polarization axis and the second polarization axis is maintained constant, and wherein the difference between the first polarization axis and the second polarization axis corresponds to an angle between the first polarization direction and the second polarization direction;
a first retardation plate configured to adjust a polarizing state of the incident light, wherein the first retardation plate is on the first optical axis of the incident light at the subject side of the first polarizing plate; and
a second retardation plate configured to convert the incident light into circularly polarized light, wherein the second retardation plate is on the first optical axis of the incident light at a side of the second polarizing plate opposite to a subject side of the second polarizing plate.

2. The transmitted light volume adjusting apparatus according to claim 1, wherein the actuator is further configured to rotate the first polarizing plate and the second polarizing plate by a certain rotation angle at a certain speed during an exposure time, based on incidence of the incident light on the first polarizing plate and the second polarizing plate.

3. The transmitted light volume adjusting apparatus according to claim 2, wherein the certain rotation angle is n times larger than a determined angle, the determined angle is larger than 0° and smaller than 90°, and wherein the n is an integer value that is greater than 0.

4. The transmitted light volume adjusting apparatus according to claim 1, wherein at least one of the first polarizing plate or the second polarizing plate has a curved surface having a certain curvature.

5. The transmitted light volume adjusting apparatus according to claim 1,
wherein the transmitted light volume adjusting apparatus is in a light path of an imaging apparatus, wherein the imaging apparatus comprises an image sensor and a lens,
wherein light reflected from a subject travels toward the image sensor through the transmitted light volume adjusting apparatus,
wherein the lens is positioned at one of a front stage or a back stage of the transmitted light volume adjusting apparatus, and
wherein the lens is configured to guide the reflected light from the subject to the image sensor.

6. The transmitted light volume adjusting apparatus according to claim 5,
wherein the actuator is further configured to rotate both the first polarizing plate and the second polarizing plate such that a second optical axis of the lens corresponds to at least one of a first axis of rotation of the first polarizing plate or a second axis of rotation of the second polarizing plate.

7. The transmitted light volume adjusting apparatus according to claim 5, wherein the actuator is further configured to rotate both the first polarizing plate and the second polarizing plate such that a second optical axis of the lens corresponds to a first axis of rotation of the first polarizing plate and a second axis of rotation of the second polarizing plate.

8. The transmitted light volume adjusting apparatus according to claim 5, wherein at least one of the first polarizing plate or the second polarizing plate has a curved surface having a certain curvature in accordance with a curvature of the lens.

9. The transmitted light volume adjusting apparatus according to claim 8, wherein the certain curvature of the curved surface of at least one of the first polarizing plate or the second polarizing plate is substantially equal to the curvature of the lens.

10. The transmitted light volume adjusting apparatus according to claim 8, further comprising a curvature changeable mechanism configured to change the certain curvature of the curved surface of at least one of the first polarizing plate or the second polarizing plate in accordance with the curvature of the lens.

11. The transmitted light volume adjusting apparatus according to claim 5, wherein the imaging apparatus further comprises an electronic shutter system.

12. The transmitted light volume adjusting apparatus according to claim 5, wherein the imaging apparatus further comprises an optical low pass filter at the side of the second polarizing plate opposite to the subject side of the second polarizing plate.

13. The transmitted light volume adjusting apparatus according to claim 1, wherein each of the first polarizing plate and the second polarizing plate has a structure in which polyvinyl alcohol (PVA) including at least an iodine-based material is between films, the films comprising triacetylcellulose (TAC).

14. The transmitted light volume adjusting apparatus according to claim 1, wherein at least one of the first polarizing plate or the second polarizing plate comprises wire grids regularly arranged on a glass substrate.

15. A transmitted light volume adjusting method, comprising:
   rotating, by an actuator, a first polarizing plate, wherein the first polarizing plate is on an optical axis of an incident light, and wherein the first polarizing plate is configured to transmit the incident light in a first polarizing direction;
   rotating, by the actuator, a second polarizing plate, wherein the second polarizing plate is on the optical axis of the incident light at a side of the first polarizing plate opposite to a subject side of the first polarizing plate, wherein the second polarizing plate is configured to transmit the incident light in a second polarizing direction,
   wherein the rotation of each of the first polarizing plate and the second polarizing plate around the optical axis of the incident light as a rotational axis is based on a difference between a first polarizing axis of the first polarizing plate and a second polarizing axis of the second polarizing plate,
   wherein the difference between the first polarizing axis and the second polarization axis is maintained constant, and
   wherein the difference between the first polarizing axis and the second polarization axis corresponds to an angle between the first polarizing direction and the second polarizing direction;
   adjusting, by a first retardation plate, a polarizing state of the incident light, wherein the first retardation plate is on the optical axis of the incident light at the subject side of the first polarizing plate; and
   converting, by a second retardation plate, the incident light into circularly polarized light, wherein the second retardation plate is on the optical axis of the incident light at a side of the second polarizing plate opposite to a subject side of the second polarizing plate.

* * * * *